US009465219B2

United States Patent
Hino et al.

(10) Patent No.: US 9,465,219 B2
(45) Date of Patent: *Oct. 11, 2016

(54) HEAD-MOUNTED IMAGE DISPLAY APPARATUS

(71) Applicant: Seiko Epson Corporation, Tokyo (JP)

(72) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,863

(22) Filed: Oct. 6, 2015

(65) Prior Publication Data

US 2016/0025984 A1 Jan. 28, 2016

Related U.S. Application Data

(63) Continuation of application No. 14/161,030, filed on Jan. 22, 2014, now Pat. No. 9,182,594.

(30) Foreign Application Priority Data

Jan. 29, 2013 (JP) ................. 2013-014036

(51) Int. Cl.
 *G02B 26/08* (2006.01)
 *G02B 27/01* (2006.01)
 *H04N 13/04* (2006.01)

(52) U.S. Cl.
 CPC ....... *G02B 27/0172* (2013.01); *G02B 26/0816* (2013.01); *H04N 13/0436* (2013.01); *G02B 2027/0178* (2013.01); *G02B 2027/0187* (2013.01)

(58) Field of Classification Search
 CPC .......... G02B 2027/0178; G02B 27/0172; G02B 26/0816; G02B 2027/0187; H04N 13/0436
 USPC ............. 359/201.1–202.1, 204.1–204.2, 359/223.1–225.1, 618, 629–630; 345/8
 See application file for complete search history.

(56) References Cited

U.S. PATENT DOCUMENTS 9,182,594 B2 * 11/2015 Hino ............... G02B 26/0816
2008/0002262 A1 * 1/2008 Chirieleison ...... G02B 27/0093
 359/630

(Continued)

FOREIGN PATENT DOCUMENTS

JP 06-030361 2/1994
JP 08-307753 11/1996

(Continued)

OTHER PUBLICATIONS

Extended European Search Report for Application No. EP 14 15 2627 dated Apr. 16, 2014 (6 pages).

*Primary Examiner* — James Phan
(74) *Attorney, Agent, or Firm* — Harness, Dickey & Pierce, P.L.C.

(57) ABSTRACT

A head-mounted image display apparatus includes: a light source that emits laser light; a splitter that splits the laser light into first laser light and second laser light having a different optical intensity than the first laser light; an image drawing section that causes the first laser light to be reflected off a mirror and causes the mirror to make pivotal motion to perform image drawing; a controller that controls the pivotal motion of the mirror; and a notification section that notifies other persons by diffusing the second laser light that the image drawing section is performing image drawing.

20 Claims, 13 Drawing Sheets

(56) References Cited

U.S. PATENT DOCUMENTS

| | | | |
|---|---|---|---|
| 2011/0012875 A1* | 1/2011 | Sakakibara | G02B 27/017 345/204 |
| 2011/0199582 A1 | 8/2011 | Kuriki et al. | |
| 2012/0105310 A1 | 5/2012 | Sverdrup et al. | |
| 2014/0184477 A1 | 7/2014 | Hino et al. | |

FOREIGN PATENT DOCUMENTS

| | | |
|---|---|---|
| JP | 2009-086365 A | 4/2009 |
| JP | 2014-126753 A | 7/2014 |
| WO | WO-96-07947 A1 | 3/1996 |

* cited by examiner

HEAD-MOUNTED IMAGE DISPLAY APPARATUS

CROSS-REFERENCE TO RELATED APPLICATIONS

This is a continuation patent application of U.S. application Ser. No. 14/161,030, filed Jan. 22, 2014, now U.S. Pat. No. 9,182,594, which claims priority to Japanese Patent Application No. 2013-014036, filed Jan. 29, 2013, both of which are expressly incorporated by reference herein in their entireties.

BACKGROUND

1. Technical Field

The present invention relates to an image display apparatus.

2. Related Art

An image apparatus mounted on the head of a person is known. JP-A-2009-86365 discloses one form of such an image display apparatus. JP-A-2009-86365 describes that the minimum brightness of a projected display image is lowered to improve the contrast ratio of the projected display image by causing light to pass through an ND filter (neutral density) or shifting the optical axis of an optical fiber.

When the optical axis of an optical fiber is shifted as in JP-A-2009-86365, however, light that has not entered the optical fiber is discarded as being unnecessary light, which means that the light usage efficiency is poor.

SUMMARY

An advantage of some aspects of the invention is to provide an image display apparatus that allows efficient use of light.

The invention can be implemented as the following aspects or application examples.

Application Example 1

This application example is directed to an image display apparatus mounted on the head of a person, the apparatus including a light source that emits laser light, a splitter that splits the laser light into first laser light and second laser light different from the first laser light in terms of optical intensity, an image drawing section that causes the first laser light to be reflected off a mirror and causes the mirror to make pivotal motion to perform image drawing, a controller that controls the pivotal motion of the mirror, and a notification section that notifies other persons by diffusing the second laser light that the image drawing section is performing image drawing.

According to this application example, the light source emits laser light toward the splitter. The splitter splits the laser light into the first laser light and the second laser light. The split laser light beams travel as follows: the first laser light impinges on the image drawing section; and the second laser light impinges on the notification section. The image drawing section includes a mirror, and the first laser light impinges on the mirror. The controller controls pivotal motion of the mirror to change the direction in which the first laser light travels for image drawing. When the image drawing section is performing image drawing, the notification section diffuses the second laser light to notify (e.g., make readily apparent, alert or broadcast) that the image drawing is underway. When the image drawing section is not performing image drawing, the light source emits no laser light, and no second laser light is therefore diffused. As a result, whether or not the image display apparatus is performing image drawing can be notified. The image display apparatus uses the laser light emitted from the light source both in the image drawing and notification operation, whereby the laser light can be efficiently used.

Application Example 2

This application example is directed to the image display apparatus according to the application example described above, wherein the optical intensity of the first laser light is lower than the optical intensity of the second laser light.

According to this application example, the laser light is split so that the optical intensity of the first laser light is lower than the optical intensity of the second laser light. When the amount of laser light emitted from the light source is very small, the optical intensity of the first laser light is unstable. The light source is therefore operated to emit laser light the amount of which is large enough to ensure stable light emission operation. In this case, when the split first laser light has a high optical intensity, the first laser light having undergone image drawing operation may damage the eyes. In this application example, the optical intensity of the second laser light is set to be higher than the optical intensity of the first laser light. Therefore, even when the light source emits laser light having a high optical intensity, the first laser light has a low optical intensity and image drawing can be performed by using the first laser light having a safe optical intensity.

Application Example 3

This application example is directed to the image display apparatus according to the application example described above, wherein the splitter splits the laser light into the first laser light and the second laser light using a reflection film that transmits part of the laser light.

According to this application example, the splitter includes a reflection film. A reflection film reflects a greater amount of light when the thickness thereof is greater, whereas transmitting a greater amount of light when the thickness thereof is smaller. The splitter can therefore readily adjust the optical intensities of the first laser light and the second laser light.

Application Example 4

This application example is directed to the image display apparatus according to the application example described above, wherein the laser light is formed of a plurality of light rays having different colors, and the splitter combines the plurality of light rays with each other and separates the plurality of light rays from each other.

According to this application example, the light source emits laser light formed of a plurality of light rays. The image drawing section can therefore perform image drawing with a large number of color light beams. The splitter combines the light beams with each other and separates the light beams from each other simultaneously. The image display apparatus can therefore be readily manufactured because the apparatus is simplified as compared with a case where an optical system that combines the light beams with each other and an optical system that separates the light beams from each other are separate optical systems.

Application Example 5

This application example is directed to the image display apparatus according to the application example described above, wherein the second laser light is red laser light.

According to this application example, the second laser light is red laser light, and the notification section diffuses the red light. Red light is more noticeable than blue light and green light. The notification section can therefore noticeably notify that image drawing is underway.

Application Example 6

This application example is directed to the image display apparatus according to the application example described above, wherein the laser light is guided through a light-source optical fiber, the first laser light is guided through a first optical fiber, and the second laser light is guided through a second optical fiber, and in the splitter, an end surface of the light-source optical fiber is connected to an end surface of the first optical fiber and an end surface of the second optical fiber, and the area of the end surface of the first optical fiber where the end surface of the first optical fiber is connected to the end surface of the light-source optical fiber is narrower than the area of the end surface of the second optical fiber where the end surface of the second optical fiber is connected to the end surface of the light-source optical fiber.

According to this application example, part of the laser light having exited out of the light-source optical fiber is incident on the first optical fiber, and part of the laser light is incident on the second optical fiber. The light incident area of the end surface of the first optical fiber is narrower than the light incident area of the end surface of the second optical fiber. The optical intensity of the first laser light incident on the first optical fiber can therefore be lower than the optical intensity of the second laser light incident on the second optical fiber.

Application Example 7

This application example is directed to the image display apparatus according to the application example described above, wherein the image display apparatus further includes an imaging section, and the notification section diffuses the second laser light to notify that the imaging section is performing imaging.

According to this application example, the notification section uses the second laser light to notify whether or not the imaging section is performing imaging. Using no second laser light requires a notification light source. The image display apparatus can therefore be readily manufactured because the apparatus can be simplified as compared with a case where a light source for notifying whether the imaging section is performing imaging is provided.

Application Example 8

This application example is directed to the image display apparatus according to the application example described above, wherein the image display apparatus further includes a light attenuator that attenuates the optical intensity of the second laser light.

According to this application example, the light attenuator adjusts the optical intensity of the second laser light. The light attenuator can therefore prevent the light diffused by the notification section from being too glaring.

Application Example 9

This application example is directed to the image display apparatus according to the application example described above, wherein the light attenuator attenuates the second laser light in accordance with the optical intensity of the second laser light to suppress change in the optical intensity of the second laser light diffused by the notification section.

According to this application example, the light attenuator attenuates the second laser light when the optical intensity thereof is high to prevent change in the optical intensity of the second laser light diffused by the notification section. The light attenuator therefore allows the light diffused by the notification section to have a readily recognizable optical intensity.

Application Example 10

This application example is directed to the image display apparatus according to the application example described above, wherein the image display apparatus further includes a support that supports the image drawing section with the aid of the head of the person, and the notification section is disposed on the support in a position visible from the front and lateral sides of the head of the person.

According to this application example, the notification section is disposed on the support, and a person who looks at the head of the person from the front can check the notification section. Further, a person who looks at the head of the person from either of the lateral sides can also check the notification section. The notification section can therefore issue notification forward and sideways with respect to the person to notify that the image display apparatus is performing image drawing.

Application Example 11

This application example is directed to the image display apparatus according to the application example described above, wherein the notification section is disposed on the support in a position visible from the lateral side on the right and the lateral side on the left when viewed from the front of the head of the person.

According to this application example, the notification section is visible from both right and left sides of the head of the person viewed from the front. Since the notification section can therefore readily be recognized from both sides of the person, the notification section can issue notification within a wide angular range to notify that the image display apparatus is performing image drawing.

Application Example 12

This application example is directed to an image display apparatus mounted on the head of a person, the apparatus including a light source that emits laser light, a splitter that splits the laser light into first laser light and second laser light different from the first laser light in terms of optical intensity, an image drawing section that performs image drawing by using the first laser light, and a notification section that notifies other persons by using the second laser light that the image drawing section is performing image drawing.

According to this application example, the light source emits laser light toward the splitter. The splitter splits the laser light into the first laser light and the second laser light. The split laser light beams travel as follows: The first laser light impinges on the image drawing section; and the second laser light impinges on the notification section. The image drawing section performs image drawing by using the first laser light. When the image drawing section is performing image drawing, the notification section diffuses the second laser light to notify that the image drawing is underway. When the image drawing section is not performing image drawing, the light source emits no laser light, and no second laser light is therefore diffused. As a result, whether or not the image display apparatus is performing image drawing can be notified. The image display apparatus uses the laser light emitted from the light source both in the image drawing and notification operation, whereby the laser light can be efficiently used.

Application Example 13

This application example is directed to the image display apparatus according to the application example described above, wherein the optical intensity of the first laser light is lower than the optical intensity of the second laser light.

According to this application example, the laser light is split so that the optical intensity of the first laser light is lower than the optical intensity of the second laser light. When the amount of laser light emitted from the light source is very small, the optical intensity of the first laser light is unstable. The light source is therefore operated to emit laser light the amount of which is large enough to ensure stable light emission operation. In this case, when the split first laser light has a high optical intensity, the first laser light having undergone image drawing operation may damage the eyes. In this application example, the optical intensity of the second laser light is set to be higher than the optical intensity of the first laser light. Therefore, even when the light source emits laser light having a high optical intensity, the first laser light has a low optical intensity and image drawing can be performed by using the first laser light having a safe optical intensity.

BRIEF DESCRIPTION OF THE DRAWINGS

Embodiments of the invention will be described with reference to the accompanying drawings, wherein like numbers reference like elements.

FIG. 7A is a diagrammatic side cross-sectional view showing the structure of a splitter, FIG. 7B is a diagrammatic plan cross-sectional view showing the structure of the splitter, and FIG. 7C is a diagrammatic side cross-sectional view showing the structure of another splitter.

DESCRIPTION OF EXEMPLARY EMBODIMENTS

Figure 1:
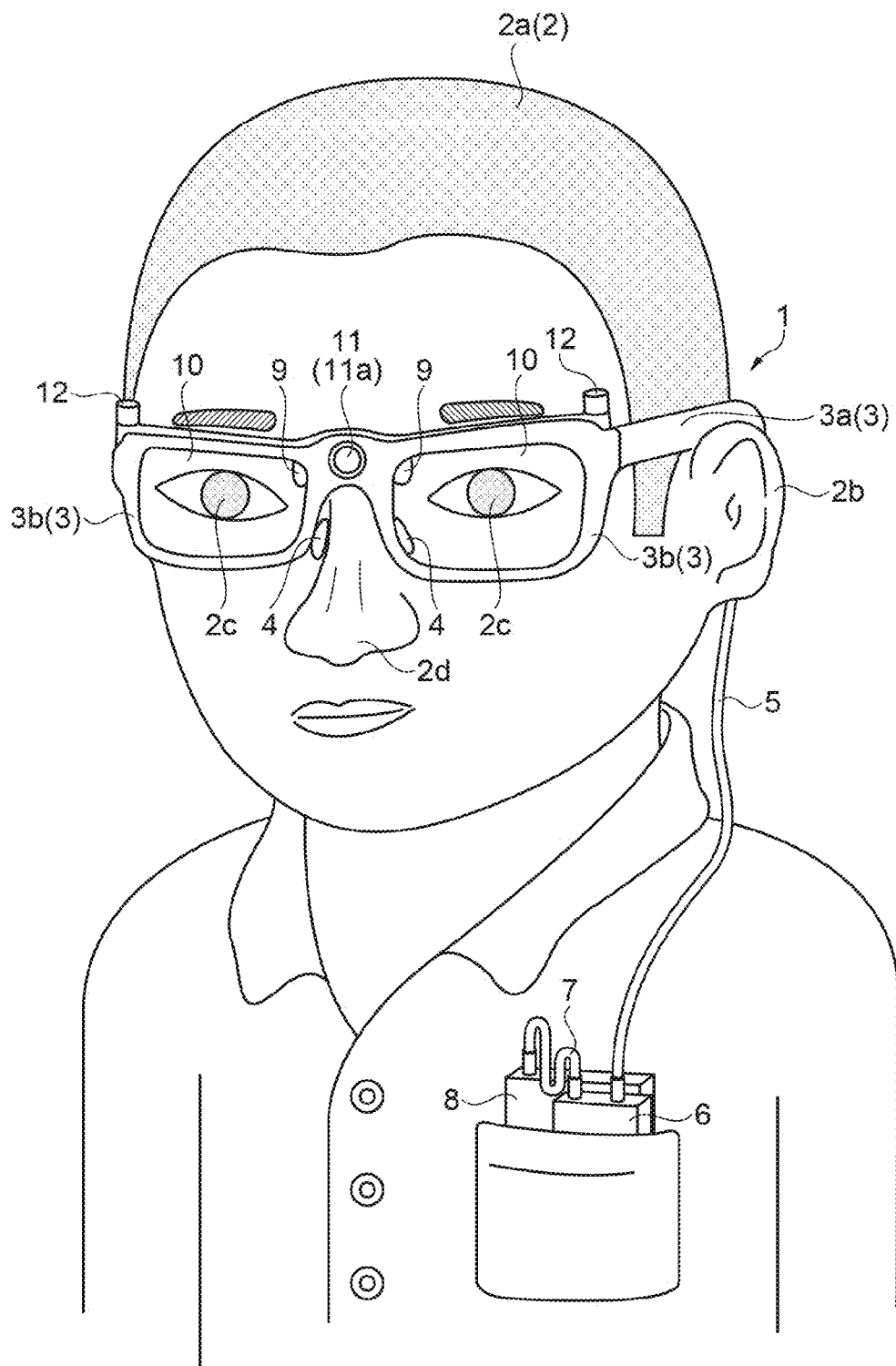
FIG. 1 is a schematic perspective view showing the structure of an image display apparatus according to a first embodiment.

A description will be made of characteristic examples of embodiments of an image display apparatus with reference to FIGS. 1 to 13A, 13B, and 13C. The embodiments will be described below with reference to the drawings. Each member is drawn in different scales so that the member is recognizably large in the drawings.

First Embodiment

An image display apparatus according to a first embodiment will be described with reference to FIGS. 1 to 6A and 6B. FIG. 1 is a schematic perspective view showing the structure of the image display apparatus. The image display apparatus 1 is mounted on a head 2a of a viewer 2, as shown in FIG. 1. The image display apparatus 1 includes a base portion 3 as a support having a shape similar to the frame of glasses. The base portion 3 includes sidepieces 3a and a frame 3b.

When the image display apparatus is mounted on the head 2a, the sidepieces 3a are located on the lateral sides of the head 2a and sandwiched between the head 2a and ears 2b of the viewer 2. The sidepieces 3a are attached to both ends of the base portion 3 and located on the right and left sides of the head 2a. The frame 3b is disposed between the two sidepieces 3a. When the image display apparatus is mounted on the head 2a, the frame 3b is located in front of the head 2a in a position facing eyes 2c of the viewer 2. A hinge is provided between the frame 3b and each of the sidepiece 3a. The hinges allow the sidepieces 3a to be folded relative to the frame 3b. A pair of nose pads 4 are attached to the frame 3b and come into contact with a nose 2d of the viewer 2. Among the components of the base portion 3, the nose pads 4 and the sidepieces 3a come into contact with the head 2a, and the base portion 3 is supported with the aid of the nose pads 4 and the sidepieces 3a.

A cable 5 is connected to one of the sidepieces 3a, and a display control unit 6 is connected to the cable 5. The cable 5 has an electric wiring line and an optical fiber built therein. The display control unit 6 is connected to a video recording/reproducing apparatus 8 via a cable 7.

The base portion 3 is provided with scanning optical output sections 9 as a pair of image drawing sections above the nose pads 4 in FIG. 1, and half-silvered mirrors 10 are disposed as the pair of image drawing sections in positions facing the eyes 2c. The base portion 3 is further provided with an imaging section 11 in a position between the pair of scanning optical output sections 9, and the imaging section 11 has a microphone 11a built therein. An image drawing notification section 12 is provided as a notification section having a circular columnar shape on the base portion 3 on the upper side in FIG. 1 in the vicinity of a portion where the frame 3b and each of the sidepiece 3a are connected to each other. In detail, the image drawing notification sections 12 are disposed on the base portion 3 in positions visible from the front and lateral sides of the head 2a. In other words, the image drawing notification sections 12 are disposed on the base portion 3, when viewed from the front of the head 2a, in a position visible from the right side and in a position visible from the left side.

Figure 2:
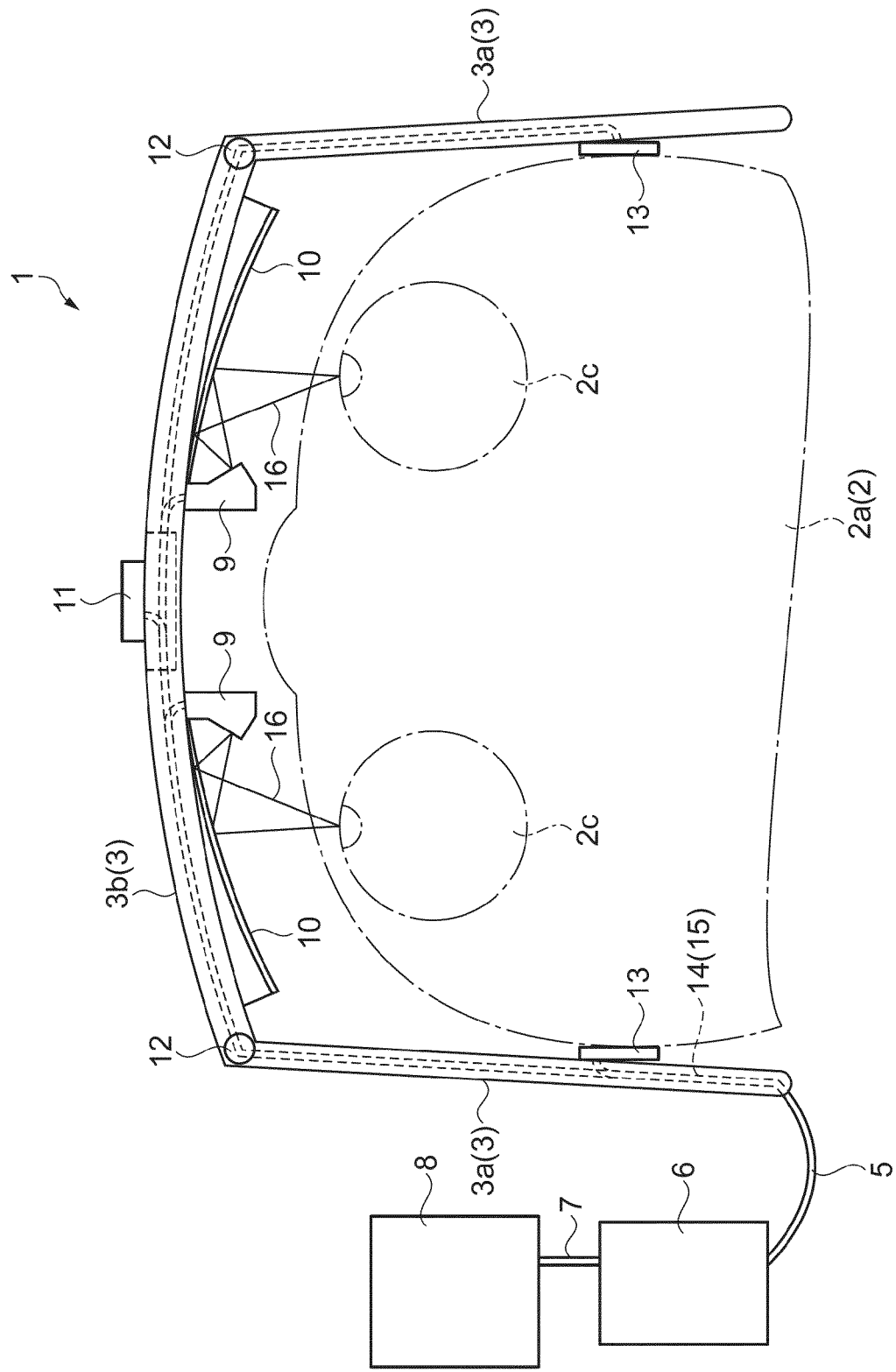
FIG. 2 is a diagrammatic plan view showing the structure of the image display apparatus.

FIG. 2 is a diagrammatic plan view showing the structure of the image display apparatus. A loudspeaker 13 is provided between the head 2a and each of the sidepieces 3a, as shown in FIG. 2. The loudspeaker 13 is preferably a bone-conduction loudspeaker. An electric wiring line 14 and an optical fiber 15, which are extensions of those in the cable 5, are provided inside the sidepieces 3a and the frame 3b. The scanning optical output sections 9, the bone-conduction loudspeakers 13, and the imaging section 11 are connected to the electric wiring line 14 and driven by the display control unit 6.

The scanning optical output sections 9 and the image drawing notification sections 12 are connected to the optical fiber 15 and receives laser light 16 from the display control unit 6. The scanning optical output sections 9 continuously deflect the laser light 16 in upward, downward, rightward, and leftward directions and output the resultant light toward the half-silvered mirrors 10. The outputted laser light is reflected off the half-silvered mirrors 10 and travels toward the eyes 2c of the viewer 2. The viewer 2 observes a virtual image formed by the image display apparatus 1.

Figure 3:
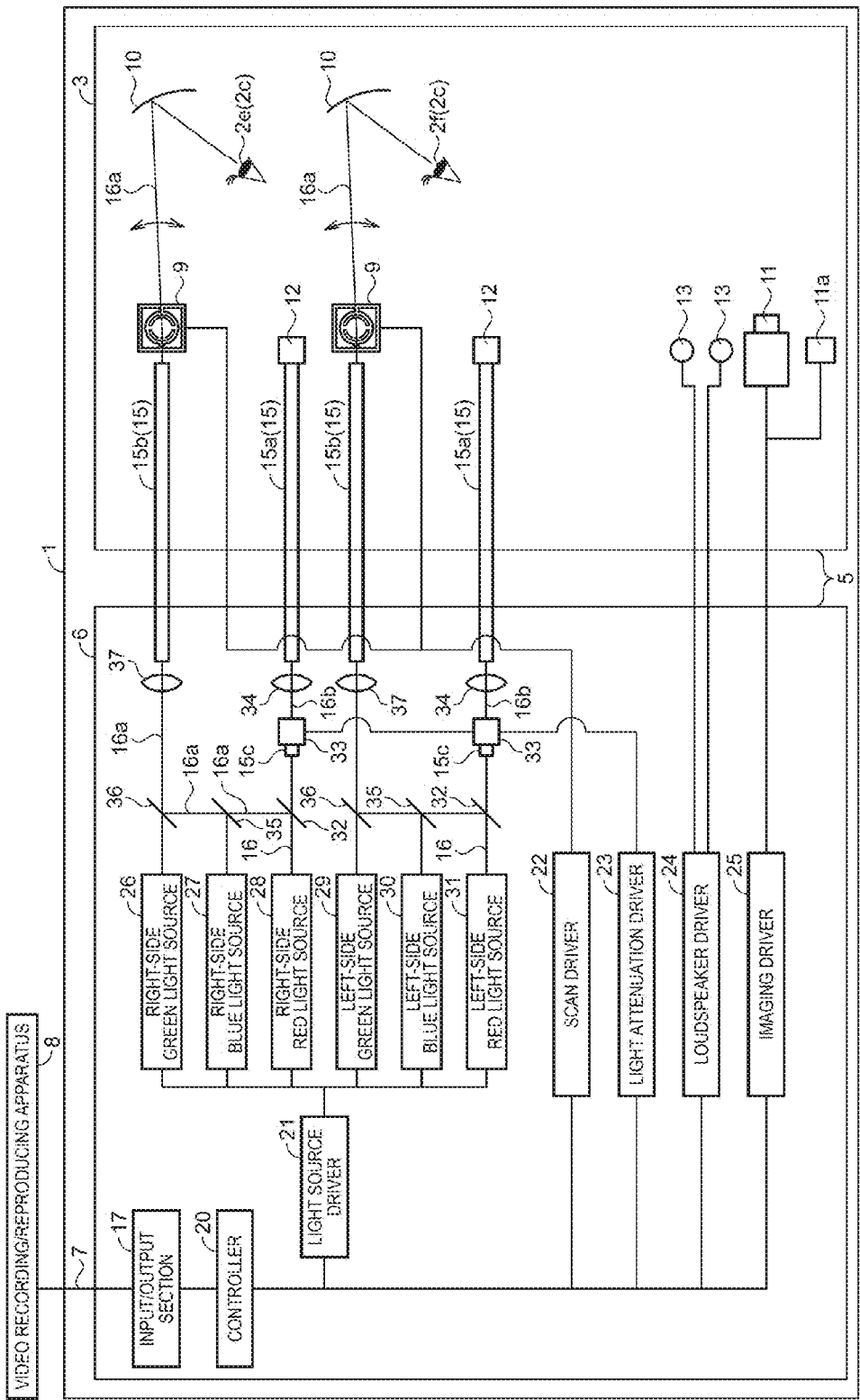
FIG. 3 is an electrical control block diagram showing the structure of the image display apparatus.

FIG. 3 is an electrical control block diagram showing the structure of the image display apparatus. The display control unit 6 provided in the image display apparatus 1 accommodates an input/output section 17, and the video recording/reproducing apparatus 8 is connected to the input/output section 17, as shown in FIG. 3. The video recording/reproducing apparatus 8 includes a storage section, which stores video image data, still image data, and audio data. The video recording/reproducing apparatus 8 outputs the video image data and the still image data to the input/output section 17. On the other hand, when the image display apparatus 1 outputs video image data, still image data, and audio data through the input/output section 17, the video recording/reproducing apparatus 8 receives the video image data, the still image data, and the audio data as inputs and stores them in the storage section.

The input/output section 17 is provided with a connector, a switch, and a variable resistor (not shown). The cable 7 is connected to the connector. The switch is disposed at a plurality of locations for power on/off operation of the image display apparatus 1, activation and deactivation of audio output, and other purposes. The variable resistor is disposed at a plurality of locations for adjustment of brightness of video images, adjustment of luminance of light through the image drawing notification sections 12, adjustment of volume of sound from the bone-conduction loudspeakers 13, and other purposes.

A controller 20 is connected to the input/output section 17. A light source driver 21, a scan driver 22, a light attenuation driver 23, a loudspeaker driver 24, an imaging driver 25, and other components are connected to the controller 20, and the controller 20 controls action of each of the components. Specifically, when the input/output section 17 inputs a video signal from the video recording/reproducing apparatus 8 to the controller 20, the controller 20 outputs a luminance signal associated with video images and a luminance adjustment signal inputted to the corresponding variable resistor to the light source driver 21. Further, when the input/output section 17 inputs the video signal to the controller 20, the controller 20 outputs a scan signal associated with the video images to the scan driver 22. In addition, the controller 20 outputs a red luminance signal that is part of the video signal to the light attenuation driver 23.

A right-side green light source 26, a right-side blue light source 27, a right-side red light source 28, a left-side green light source 29, a left-side blue light source 30, and a left-side red light source 31 are connected to the light source driver 21. The right-side green light source 26, the right-side blue light source 27, and the right-side red light source 28 supply the laser light 16 to the scanning optical output section 9 that outputs the laser light 16 to the right eye 2e. The left-side green light source 29, the left-side blue light source 30, and the left-side red light source 31 supply the laser light 16 to the scanning optical output section 9 that outputs the laser light 16 to the left eye 2f.

When the video signal is a signal for a stereoscopic image, the video signal has a right-eye video signal to be observed with the right eye 2e and a left-eye video signal to be observed with the left eye 2f. When the video signal is a signal for a color image, each of the right-eye and left-eye video signals has a green signal, a blue signal, and a red signal.

The light source driver 21 outputs electric power according to the video signal to each of the right-side green light source 26 to the left-side red light source 31. In detail, electric power according to the green signal of the right-eye video signal is outputted to the right-side green light source 26, and electric power according to the blue signal of the right-eye video signal is outputted to the right-side blue light source 27. Further, electric power according to the red signal of the right-eye video signal is outputted to the right-side red light source 28. Similarly, electric power according to the green signal of the left-eye video signal is outputted to the left-side green light source 29, and electric power according to the blue signal of the left-eye video signal is outputted to the left-side blue light source 30. Further, electric power according to the red signal of the left-eye video signal is outputted to the left-side red light source 31.

Each of the right-side green light source 26 and the right-side blue light source 27 has an ND (neutral density) filter built therein. The attenuation factor of the ND filter is not limited to a specific value, but laser light 16 having a magnitude of about 1/10000 of the amount of laser light emitted from the light source is outputted through the ND filter in the present embodiment. The light emitted from the right-side red light source 28 is not attenuated and the entire amount of laser light is outputted.

The laser light 16 emitted from the right-side red light source 28 impinges on a first half-silvered mirror 32, which works as a splitter. Part of the laser light 16 emitted from the right-side red light source 28 is reflected off and redirected by the first half-silvered mirror 32 to form image drawing laser light 16a as first laser light. The ratio of the amount of image drawing laser light 16a to the amount of laser light 16 emitted from the right-side red light source 28 is not limited to a specific value and is about 1/500000 to 1/1000000 in the present embodiment. For example, in the present embodiment, the laser light 16 emitted from the right-side red light source 28 has an optical intensity ranging from 100 to 150 mW, and the image drawing laser light 16a has an optical intensity ranging from 200 to 300 nW. Notification laser light 16b having the remaining amount of light as second laser light travels straight through the first half-silvered mirror 32 and impinges on a variable ND filter 33, which works as a light attenuator. Therefore, the image drawing laser light 16a is reflected off the first half-silvered mirror 32, and the notification laser light 16b exits through the first half-silvered mirror 32 at the same time. The optical intensity of the image drawing laser light 16a is lower than the optical intensity of the notification laser light 16b. The variable ND filter 33 attenuates the notification laser light 16b passing therethrough, and the attenuation factor of the variable ND filter 33 is changed by the light attenuation driver 23, which drives the variable ND filter 33.

The notification laser light 16b having passed through the variable ND filter 33 impinges on a focusing lens 34. The notification laser light 16b having passed through the focusing lens 34 impinges on a notification optical fiber 15a as a second optical fiber. The focusing lens 34 focuses the notification laser light 16b to the center of an end surface of the notification optical fiber 15a. The focusing lens 34 can thus guide the notification laser light 16b into the notification optical fiber 15a with a small amount of accompanied loss.

The image drawing notification section 12 is disposed on the opposite end of the notification optical fiber 15a to the focusing lens 34. The image drawing notification section 12 is disposed on the base portion 3 in the vicinity of the right eye 2e. The notification laser light 16b having guided through the notification optical fiber 15a is diffused by the image drawing notification section 12. A person who looks at the image drawing notification section 12 is notified that the viewer 2 is observing video images.

The red image drawing laser light 16a reflected off the first half-silvered mirror 32 impinges on a second half-silvered mirror 35, which works as the splitter, and part of the laser light passes through the second half-silvered mirror 35. The blue laser light 16 emitted from the right-side blue light source 27 also impinges on the second half-silvered mirror 35, and part of the laser light is reflected off and redirected by the second half-silvered mirror 35. The red image drawing laser light 16a having passed through the second half-silvered mirror 35 and the blue image drawing laser light 16a having been reflected off the second half-silvered mirror 35 are combined with each other, and the combined laser light impinges on a third half-silvered mirror 36, which works as the splitter.

Part of both the red and blue image drawing laser light 16a having impinged on the third half-silvered mirror 36 is reflected off the third half-silvered mirror 36 and impinges on a focusing lens 37. The green laser light 16 outputted from the right-side green light source 26 also impinges on the third half-silvered mirror 36, and part of the laser light passes through the third half-silvered mirror 36 and impinges on the focusing lens 37. The red, blue, and green image drawing laser light beams 16a having impinged on the focusing lens 37 are combined with each other, and the focusing lens 37 focuses the combined light to the center of an end surface of an image drawing optical fiber 15b as a first optical fiber. The focusing lens 37 can thus guide the image drawing laser light 16a into the image drawing optical fiber 15b with a small amount of accompanied loss.

The first half-silvered mirror 32 to the third half-silvered mirror 36 form the splitter, and each of the half-silvered mirrors is provided with a reflection film. The reflection films are therefore used to separate the laser light 16 outputted from the right-side green light source 26 to the right-side red light source 28 into the image drawing laser light 16a and the notification laser light 16b. A reflection film reflects a greater amount of light when the thickness thereof is greater, whereas transmitting a greater amount of light when the thickness thereof is smaller. The first half-silvered mirror 32 can therefore readily adjust the optical intensities of the image drawing laser light 16a and the notification laser light 16b.

One of the scanning optical output sections 9 is disposed at the opposite end of the image drawing optical fiber 15b to the focusing lens 37. The image drawing laser light 16a guided through the image drawing optical fiber 15b impinges on the scanning optical output section 9. The scanning optical output section 9 is provided with a mirror and causes the mirror to make pivotal motion in upward, downward, rightward, and leftward directions. The image drawing laser light 16a having impinged on the scanning optical output section 9 is redirected by the scanning optical output section 9 and impinges on the half-silvered mirror 10. The scan driver 22 controls the pivotal motion of the mirror in the scanning optical output section 9 to cause the mirror to scan the half-silvered mirror 10 with the image drawing laser light 16a. The image drawing laser light 16a reflected off the half-silvered mirror 10 impinges on the right eye 2e.

The image drawing laser light 16a that impinges on the right eye 2e has been modulated in terms of luminance based on the video signal and has undergone the scanning of the half-silvered mirror 10. The viewer 2 can therefore observe a virtual image drawn on the half-silvered mirror 10.

The path along which the laser light 16 outputted from the left-side green light source 29 to the left-side red light source 31 travels and reaches the left eye 2f is the same as the path along which the laser light 16 outputted from the right-side green light source 26 to the right-side red light source 28 travels and reaches the right eye 2e, and no description of the path associated with the left-side light sources will therefore be made.

When the input/output section 17 inputs the audio signal to the controller 20 from the video recording/reproducing apparatus 8, the controller 20 outputs the audio signal and a volume adjustment signal inputted to the corresponding variable resistor to the loudspeaker driver 24. The loudspeaker driver 24 outputs a drive signal produced by amplifying the audio signal in accordance with the volume adjustment signal. The pair of bone-conduction loudspeakers 13 are connected to the loudspeaker driver 24 and driven by the drive signal.

The imaging section 11 and the microphone 11a are connected to the imaging driver 25. The imaging driver 25 drives the imaging section 11 to perform imaging and outputs the resultant video signal. The imaging driver 25 further drives the microphone 11a to convert sound into an audio signal. After the imaging driver 25 outputs the video signal and the audio signal to the controller 20, the controller 20 outputs the video signal and the audio signal to the video recording/reproducing apparatus 8 via the input/output section 17. The video recording/reproducing apparatus 8 receives the video signal and the audio signal as inputs and stores them.

Figure 4A:
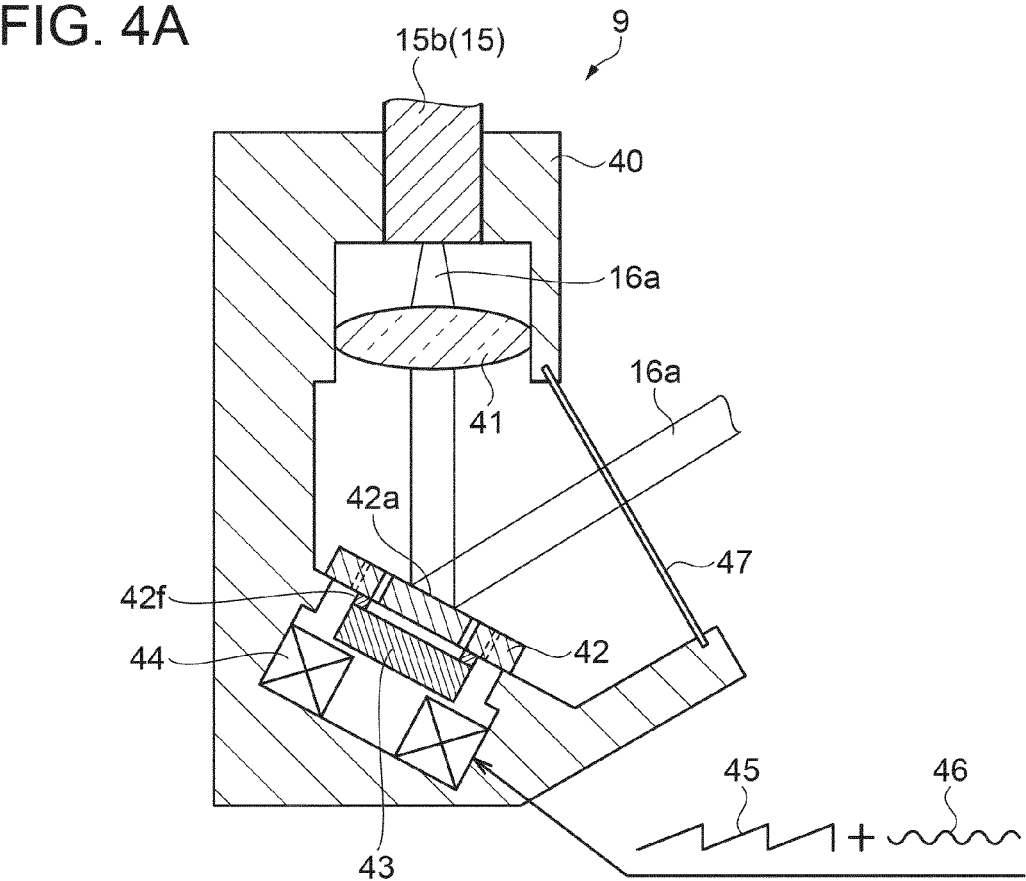
FIG. 4A is a diagrammatic side cross-sectional view showing the structure of a scanning optical output section.
Figure 4B:
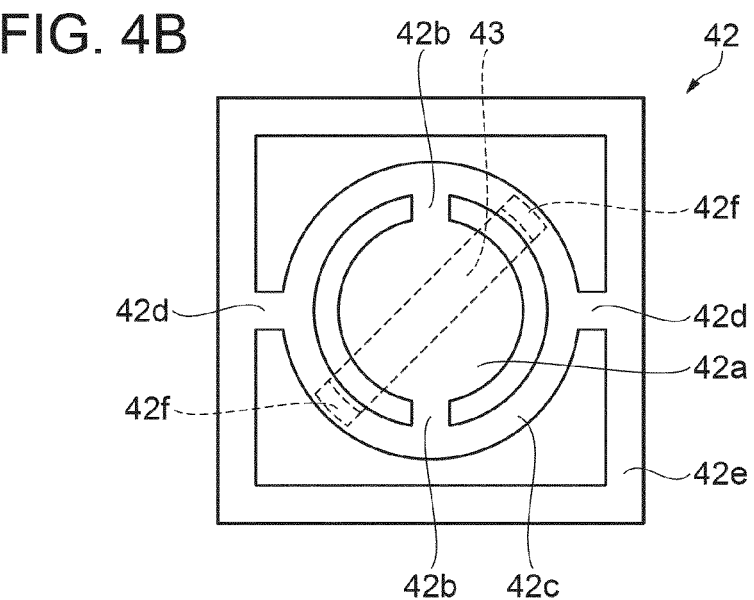
FIG. 4B is a diagrammatic plan view showing the structure of a scanner.

FIG. 4A is a diagrammatic side cross-sectional view showing the structure of each of the scanning optical output sections, and FIG. 4B is a diagrammatic plan view showing the structure of a scanner. The scanning optical output section 9 includes a substrate 40, and the substrate 40 has a cavity formed therein, as shown in FIG. 4A. A hole is provided in the substrate 40 in an upper portion thereof in FIG. 4A, and the axis of the hole extends in the upward/downward direction. The image drawing optical fiber 15b is inserted into the hole and fixed therein. A coupling lens 41 is provided below the image drawing optical fiber 15b in FIG. 4A, and the image drawing laser light 16a having exited out of the image drawing optical fiber 15b passes through the coupling lens 41.

The coupling lens 41 adjusts the spot diameter of the image drawing laser light 16a having exited out of the image drawing optical fiber 15b. The coupling lens 41 further has a function of a collimator lens that parallelizes the image drawing laser light 16a. A scanner 42 is provided below the coupling lens 41 in FIG. 4A. The scanner 42 has a mirror 42a formed at the center of the surface of the scanner that faces the coupling lens 41. The image drawing laser light 16a having passed through the coupling lens 41 is incident on the mirror 42a, reflected off and redirected by the mirror 42a.

A magnet 43 is provided on the opposite surface of the scanner 42 to the mirror with a pair of supports 42f interposed between the surface and the magnet 43. An electromagnet 44 is provided in the substrate 40 on the side where the magnet 43 is disposed with respect to the scanner 42, and the electromagnet 44 exerts an attractive force or a repulsive force on the magnet 43. The controller 20 drives the scanner 42 by instructing the scan driver 22 to supply the electromagnet 44 with a current having a sawtooth vertical scan waveform. 45 and a current having a sinusoidal horizontal scan waveform 46. The two waveforms are formed so that the frequency of the horizontal scan waveform 46 is higher than the frequency of the vertical scan waveform 45.

A collector lens 47 is provided in a position along the direction in which the image drawing laser light 16a reflected off the mirror 42a travels. The collector lens 47 is preferably an aspheric lens. The image drawing laser light 16a passes through the collector lens 47 and is reflected off the half-silvered mirror 10. The collector lens 47 collects the image drawing laser light 16a in such a way that the image drawing laser light 16a reflected off the half-silvered mirror 10 is parallelized.

As shown in FIG. 4B, the mirror 42a located at the center of the scanner 42 is supported by first beams 42b provided in the upward/downward direction in FIG. 4B. The mirror 42a therefore pivots around the first beams 42b. The first beams 42b are fixed to an annular first support frame 42c located around the mirror 42a. The first support frame 42c is provided with two supports 42f, which support both ends of the magnet 43. The first support frame 42c is supported by second beams 42d provided in the rightward/leftward direction in FIG. 4B. The first support frame 42c therefore pivots around the second beams 42d. The second beams 42d are fixed to a rectangular second support frame 42e located around the first support frame 42c, and the second support frame 42e is fixed to the substrate 40.

The current having the vertical scan waveform 45 and the current having the horizontal scan waveform 46 are conducted through the electromagnet 44. The natural frequency of the mirror 42a, which pivots around the first beams 42b, is equal to the frequency of the horizontal scan waveform 46. The mirror 42 therefore pivots around the first beams 42b in response to the horizontal scan waveform 46. The natural frequency of the first support frame 42c and the mirror 42a, which pivot around the second beams 42d, is equal to the frequency of the vertical scan waveform 45. The mirror 42a therefore pivots around the second beams 42d in response to the vertical scan waveform 45.

The axial direction of the pivotal motion around the first beams 42b is perpendicular to the axial direction of the pivotal motion around the second beams 42d. When the mirror 42a pivots around the second beams 42d, the position where the laser light 16 impinges on the half-silvered mirror 10 moves in the upward/downward direction with respect to the viewer 2. The laser light 16 thus undergoes vertical scanning. When the mirror 42a pivots around the first beams 42b, the position where the laser light 16 impinges on the half-silvered mirror 10 moves in the rightward/leftward direction with respect to the viewer 2. The laser light 16 thus undergoes horizontal scanning. The mirror 42a causes the laser light 16 to undergo horizontal scanning in response to the horizontal scan waveform 46 and vertical scanning in response to the vertical scan waveform 45.

Figure 5A:
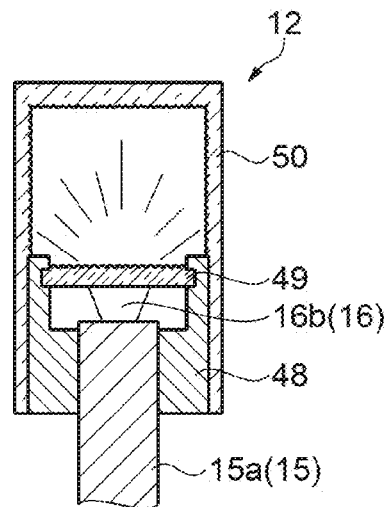
FIG. 5A is a diagrammatic cross-sectional view showing the structure of a notification section.

FIG. 5A is a diagrammatic cross-sectional view showing the structure of each of the notification sections. Each of the image drawing notification sections 12 includes a cylindrical base 48, which has a hole formed through the base 48 in the upward/downward direction in FIG. 5A. The notification optical fiber 15a is inserted into the hole and fixed therein. The notification laser light 16b exits upward in FIG. 5A out of the notification optical fiber 15a. A diffuser plate 49 is provided above the notification optical fiber 15a in FIG. 5A. A large number of irregularities are formed on the surfaces of the diffuser plate 49. When the notification laser light 16b passes through the diffuser plate 49, the laser light is diffused and redirected in a variety of directions. A circular columnar space is present above the diffuser plate 49 in FIG. 5A, and an exterior portion 50 is provided so that it covers the space. The exterior portion 50 has a cylindrical shape having a bottom and has a large number of irregularities formed on the inner surface thereof. When the notification laser light 16b passes through the exterior portion 50, the laser light is therefore further diffused and redirected in a variety of directions. As a result, the optical intensity distribution of the laser light 16 changes from an angled shape to a substantially spherical shape.

Figure 5B:
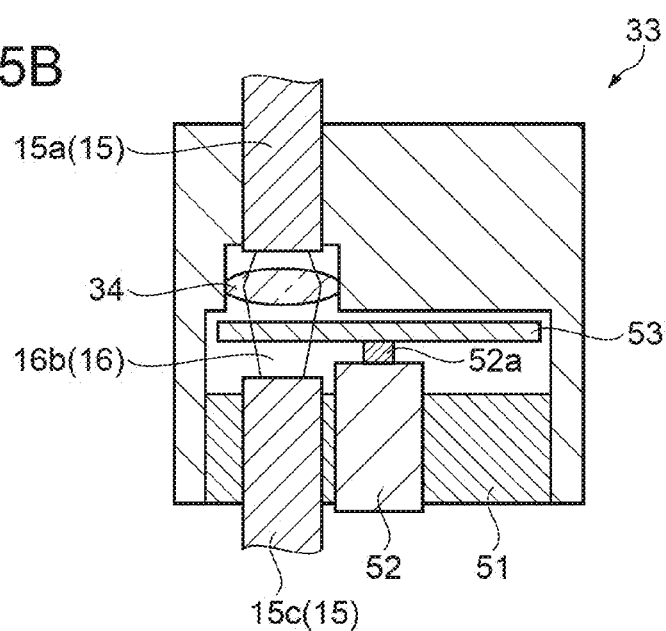
FIG. 5B is a diagrammatic cross-sectional view showing the structure of a variable ND filter.
Figure 5C:
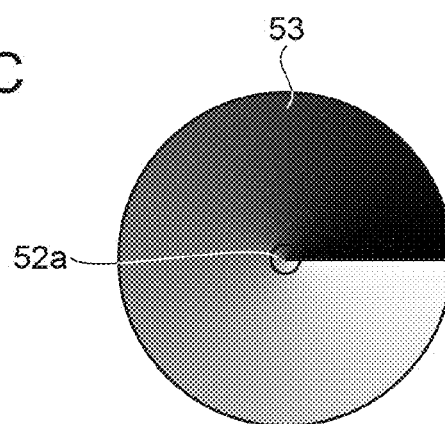
FIG. 5C is a diagrammatic plan view showing the structure of a disk filter.

FIG. 5B is a diagrammatic cross-sectional view showing the structure of the variable ND filter. FIG. 5C is a diagrammatic plan view showing the structure of a disk filter. The variable ND filter 33 includes a substrate 51 having a box-like shape, as shown in FIG. 5B. Two through holes are formed in the substrate 51, and a light-source-side optical fiber 15c is inserted into one of the through holes and fixed therein. A motor 52 is provided in the other through hole. The motor 52 is preferably a stepper motor, and the angle of rotation thereof is controlled by the light attenuation driver 23. A disk filter 53 having a circular-plate-like shape is attached to a rotary shaft 52a of the motor 52 and located in a position facing the light-source-side optical fiber 15c. The notification laser light 16b having exited out of the light-source-side optical fiber 15c impinges on the disk filter 53.

The focusing lens 34 is disposed on the opposite side of the disk filter 53 to the light-source-side optical fiber 15c. The notification laser light 16b having impinged on the disk filter 53 passes through the disk filter 53 and impinges on the focusing lens 34. The notification optical fiber 15a is disposed on the opposite side of the focusing lens 34 to the disk filter 53. The notification laser light 16b having impinged on the focusing lens 34 passes through the focusing lens 34 and is focused on the end surface of the notification optical fiber 15a. The notification laser light 16b focused onto the notification optical fiber 15a travels through the notification optical fiber 15a.

The disk filter 53 rotates around the rotary shaft 52a and changes its attenuation factor at which the notification laser light 16b is attenuated in accordance with the circumferential position where the laser light passes, as shown in FIG. 5C. When the motor 52 rotates the disk filter 53, the attenuation factor at which the laser light 16 that passes through the disk filter 53 is attenuated can be controlled in accordance with the angle of rotation.

Figure 6A:
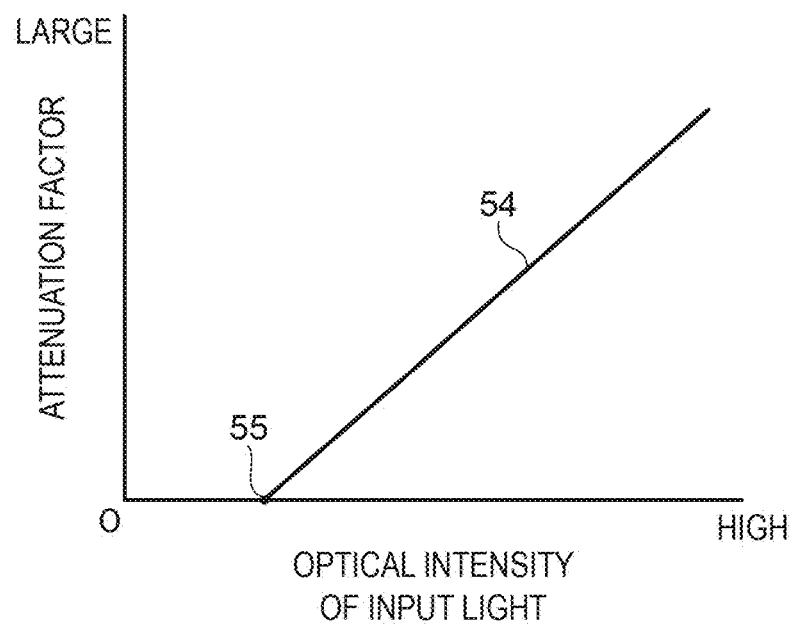
FIG. 6A is a graph showing the relationship between the optical intensity of laser light inputted to the variable ND filter and the attenuation factor of a disk filter.
Figure 6B:
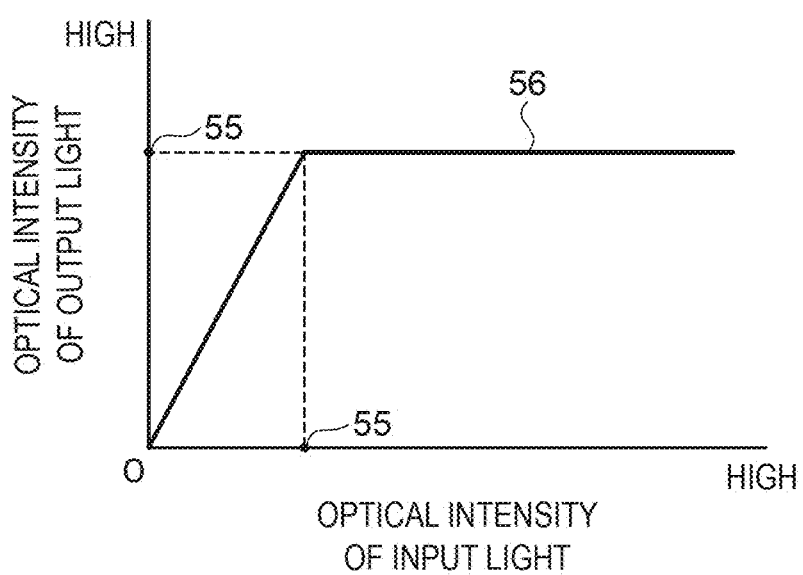
FIG. 6B is a graph showing the relationship between the optical intensity of the laser light inputted to the variable ND filter and the optical intensity of output light outputted from the variable ND filter.

FIG. 6A is a graph showing the relationship between the optical intensity of the laser light that impinges on the variable ND filter and the attenuation factor of the disk filter. FIG. 6B is a graph showing the relationship between the optical intensity of the laser light that impinges on the variable ND filter and the optical intensity of output light having exited through the variable ND filter.

In FIG. 6A, the horizontal axis represents the optical intensity of input light, and the optical intensity increases from left to right. The optical intensity along the horizontal axis represents the optical intensity of the notification laser light 16b that exits out of the light-source-side optical fiber 15c and impinges on the variable ND filter 33. The vertical axis represents the attenuation factor at which the variable ND filter 33 attenuates the notification laser light 16b. The attenuation factor decreases from above to below. The input light is the laser light 16 that impinges on the disk filter 53. An attenuation factor line 54 represents the relationship between the optical intensity of the input light and the attenuation factor.

When the optical intensity of the input light is lower than an intensity judgment value 55, the variable ND filter 33 does not attenuate the input light, as indicated by the attenuation factor line 54. When the optical intensity of the input light is greater than the intensity judgment value 55, the variable ND filter 33 attenuates the input light in proportion to the optical intensity of the input light.

The controller 20 outputs data that indicates the amount of light to be outputted from the right-side red light source 28 to the light source driver 21 and the light attenuation driver 23. The light attenuation driver 23 performs an arithmetical operation on the data that indicates the amount of light by using predetermined parameters to calculate an estimated optical intensity of the input light. The light attenuation driver 23 then calculates the attenuation factor of the variable ND filter 33 based on the attenuation factor line 54 and the estimated optical intensity of the input light. The light attenuation driver 23 then rotates the motor 52, to which the variable ND filter 33 is attached, in such a way that the attenuation factor of the disk filter 53 in a position where the notification laser light 16b passes is equal to the calculated attenuation factor. The variable ND filter 33 thus attenuates the laser light 16.

In FIG. 6B, the horizontal axis represents the optical intensity of the input light, and the optical intensity increases from left to right. The output light is the laser light 16 having passed through the disk filter 53. The vertical axis represents the optical intensity of the output light, and the optical intensity decreases from above to below. The optical intensity along the vertical axis represents the optical intensity of the notification laser light 16b outputted from the variable ND filter 33 to the notification optical fiber 15a.

An optical intensity correlation line 56 shows the relationship between the optical intensity of the input light and the optical intensity of the output light. When the optical intensity of the input light is smaller than or equal to the intensity judgment value 55, the input light is not attenuated, and hence the optical intensity of the output light is equal to that of the input light, as indicated by the optical intensity correlation line 56. When the optical intensity of the input light is greater than the intensity judgment value 55, the input light is attenuated. As a result, the optical intensity of the output light is maintained at the intensity judgment value 55. The notification laser light 16b diffused by the image drawing notification section 12 is thus limited to be smaller than or equal to a predetermined optical intensity.

The laser light 16 outputted from the left-side red light source 31 also passes through the variable ND filter 33. The variable ND filter 33 attenuates the notification laser light 16b associated with the left-side light source 31 in the same manner as the laser light 16 outputted from the right-side red light source 28 is attenuated. The notification laser light 16b diffused by the left image drawing notification section 12 is therefore also limited to be smaller than or equal to the predetermined optical intensity.

The above described embodiment provides, at least, the following advantageous effects.

(1) According to the present embodiment, when the scanning optical output sections 9 and the half-silvered mirrors 10 draw a virtual image, the image drawing notification sections 12 diffuse the notification laser light 16b and notify (e.g., alerts) that image drawing is underway. The image drawing notification sections 12 can thus notify whether or not the image display apparatus 1 is performing image drawing.

(2) According to the present embodiment, the laser light 16 is split so that the optical intensity of the image drawing laser light 16a is lower than the optical intensity of the notification laser light 16b. When each of the right-side green light source 26 to the left-side red light source 31 emits laser light 16 having a very low optical intensity, the optical intensity is unstable. Each of the right-side green light source 26 to the left-side red light source 31 is therefore operated to emit laser light 16 having an optical intensity high enough to ensure a stable optical intensity. In this case, when the split image drawing laser light 16a has a high optical intensity, the eyes may be damaged. In the present embodiment, the optical intensity of the notification laser light 16b is set to be higher than the optical intensity of the image drawing laser light 16a. Therefore, even when each of the right-side green light source 26 to the left-side red light source 31 emits laser light 16 having a high optical intensity, the image drawing laser light 16a has a low optical intensity and image drawing can be performed by using the image drawing laser light 16a having a safe optical intensity.

(3) According to the present embodiment, the first half-silvered mirror 32 is provided with a reflection film. A reflection film reflects a greater amount of light when the thickness thereof is greater, whereas transmitting a greater amount of light when the thickness thereof is smaller. The first half-silvered mirror 32 can therefore readily adjust the optical intensities of the image drawing laser light 16a and the notification laser light 16b.

(4) According to the present embodiment, the right-side green light source 26 to the right-side red light source 28 emit green, blue, and red laser light beams 16, respectively. The first half-silvered mirror 32 to the third half-silvered mirror 36, each of which is provided with a reflection film, are used to combine the image drawing laser light beams 16a with each other and separate the notification laser light beams 16b from the other light beams at the same time. The configuration of the apparatus can therefore be simplified as compared with a case where an optical system that combines the image drawing laser light beams 16a with each other and an optical system that separates the notification laser light beam 16b from the other laser light beams are separate optical systems.

(5) According to the present embodiment, the notification laser light 16b is red laser light, and the image drawing notification sections 12 diffuse the red light. Red light is more noticeable than blue light and green light. The image drawing notification sections 12 can therefore noticeably notify that image drawing is underway.

(6) According to the present embodiment, the variable ND filter 33 adjusts the optical intensity of the notification laser light 16b. The variable ND filter 33 can therefore prevent the light diffused by the image drawing notification sections 12 from being too glaring.

(7) According to the present embodiment, the variable ND filter 33 attenuates the notification laser light 16b when the optical intensity thereof is high to prevent change in the optical intensity of the notification laser light 16b diffused by the image drawing notification sections 12. The variable ND filter 33 therefore allows the notification laser light 16b diffused by the image drawing notification sections 12 to have a readily recognizable optical intensity.

(8) According to the present embodiment, the image drawing notification sections 12 are disposed on the base portion 3, and a person who looks at the head 2a from the front can check the image drawing notification sections 12. Further, a person who looks at the head 2a from either of the lateral sides can also check the image drawing notification sections 12. The image drawing notification sections 12 can therefore issue notification forward and sideways with respect to the viewer 2 to notify that the image display apparatus 1 is performing image drawing.

(9) According to the present embodiment, the image drawing notification sections 12 are visible from both right and left sides of the head 2a viewed from the front. Since the image drawing notification sections 12 can therefore readily be recognized from both sides of the viewer 2, the image drawing notification sections 12 can issue notification within a wide angular range to notify that the image display apparatus 1 is performing image drawing.

Second Embodiment

Another embodiment of the image display apparatus will be described next with reference to FIGS. 7A to 7C. The present embodiment differs from the first embodiment in that the first half-silvered mirror 32 is differently formed. The same points as those in the first embodiment will not be described.

Figure 7A:
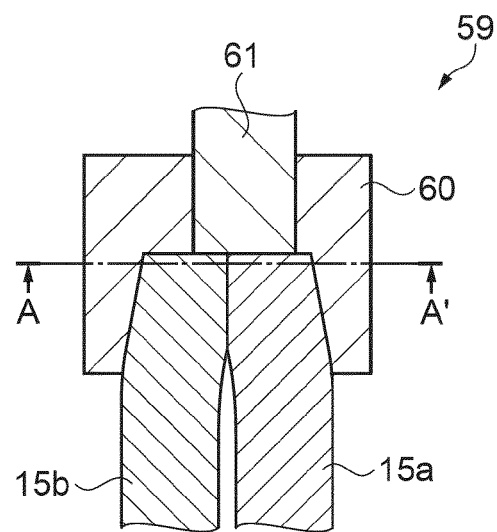
FIGS. 7A to 7C relate to a second embodiment.

FIG. 7A is a diagrammatic side cross-sectional view showing the structure of the splitter. That is, in the present embodiment, the first half-silvered mirror 32 is replaced with a splitter 59, as shown in FIG. 7A. The splitter 59 includes a base portion 60 having a box-like shape. A hole is formed in the base portion 60 from above in FIG. 7A to a depth equal to one-half the thickness of the base portion 60, and a light-source optical fiber 61 is inserted into the hole and fixed therein. The light-source optical fiber 61 has a flat end surface on the lower side in FIG. 7A. The laser light 16 from the right-side red light source 28 impinges on the light-source optical fiber 61.

Two holes are formed in the base portion 60 from below in FIG. 7A to a depth where the holes reach the light-source optical fiber 61. The two holes communicate with each other in the radial direction. The notification optical fiber 15a is disposed in the hole on the right side in FIG. 7A, and the image drawing optical fiber 15b is disposed in the hole on the left side in FIG. 7A. The notification optical fiber 15a and the image drawing optical fiber 15b are fixed to the base portion 60. Each of the notification optical fiber 15a and the image drawing optical fiber 15b has a flat end surface on the upper side in FIG. 7A. The end surface of the light-source optical fiber 61 on the lower side in FIG. 7A is in contact with the end surface of each of the notification optical fiber 15a and the image drawing optical fiber 15b on the upper side in FIG. 7A. It is preferable to provide a light transmissive resin or any other suitable material between the end surfaces so that the refractive index does not sharply change. Providing such a material prevents the laser light 16 from being reflected off the end surfaces.

Figure 7B:
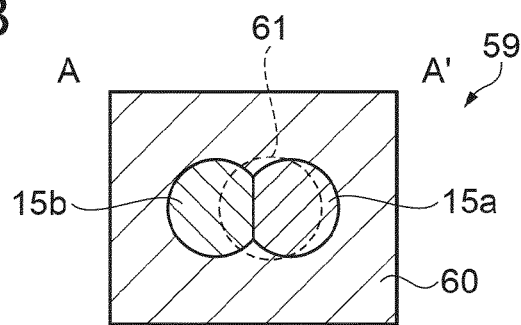

FIG. 7B is a diagrammatic plan cross-sectional view showing the structure of the splitter taken along the line A-A' in FIG. 7A. The notification optical fiber 15a and the image drawing optical fiber 15b have flat surfaces where they come into contact with each other and are disposed so that they are in contact with each other, as shown in FIG. 7B. The area of the end surface of the light-source optical fiber 61 where it overlaps with the end surface of the image drawing optical fiber 15b is narrower than the area of the end surface of the light-source optical fiber 61 where it overlaps with the end surface of the notification optical fiber 15a.

The laser light 16 having passed through the light-source optical fiber 61 is therefore split into two laser light beams inputted to the notification optical fiber 15a and the image drawing optical fiber 15b. The optical intensity of the laser light 16 inputted to the image drawing optical fiber 15b is lower than the optical intensity of the laser light 16 inputted to the notification optical fiber 15a. The laser light 16 having passed through the light-source optical fiber 61 has a Gaussian optical intensity distribution, and the optical intensity is maximized at the center of the light-source optical fiber 61. The notification optical fiber 15a is in contact with the portion where the optical intensity is maximized. As a result, the optical intensity of the laser light 16 inputted to the image drawing optical fiber 15b is lower than the optical intensity of the laser light 16 inputted to notification optical fiber 15a.

Another form of the splitter that splits the laser light 16 will be introduced below. FIG. 7C is a diagrammatic side cross-sectional view showing the structure of the splitter. That is, the first half-silvered mirror 32 is replaced with a splitter 62, as shown in FIG. 7C. The splitter 62 has a base portion 63 having a box-like shape. A cavity 63a is formed in a central portion of the base portion 63. A hole is formed in the base portion 63 from above in FIG. 7C toward the cavity 63a, and the light-source optical fiber 61 is inserted into the hole and fixed therein. The light-source optical fiber 61 has a flat end surface on the lower side in FIG. 7C. The laser light 16 from the right-side red light source 28 impinges on the light-source optical fiber 61.

Two holes are formed in the base portion 63 from below in FIG. 7C toward the cavity 63a. The notification optical fiber 15a is disposed in the hole on the right side in FIG. 7C, and the image drawing optical fiber 15b is disposed in the hole on the left side in FIG. 7C. The notification optical fiber 15a and the image drawing optical fiber 15b are fixed to the base portion 63. Each of the notification optical fiber 15a and the image drawing optical fiber 15b has a flat end surface on the upper side in FIG. 7C.

Figure 7C:
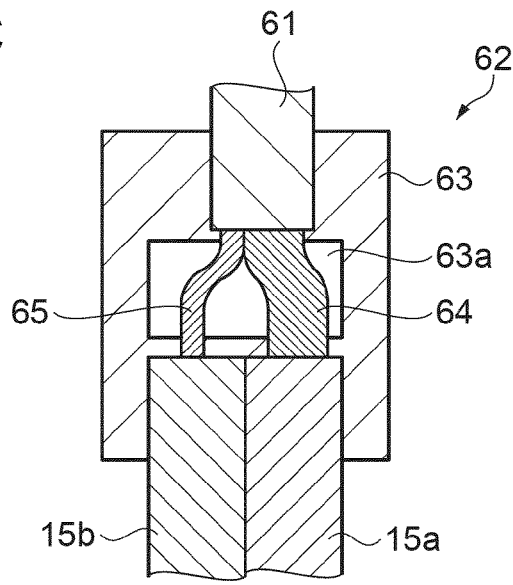

A notification optical fiber for connection 64 as the second optical fiber is provided between the end surface of the light-source optical fiber 61 that faces downward in FIG. 7C and the end surface of the notification optical fiber 15a that faces upward in FIG. 7C. An image drawing optical fiber for connection 65 as the first optical fiber is provided between the end surface of the light-source optical fiber 61 that faces downward in FIG. 7C and the end surface of the image drawing optical fiber 15b that faces upward in FIG. 7C. It is preferable to provide a light transmissive adhesive or any other suitable material between the end surfaces so that the refractive index does not sharply change. Providing such a material prevents the laser light 16 from being reflected off the end surfaces.

The area of the end surface of the light-source optical fiber 61 where it overlaps with the end surface of the image drawing optical fiber for connection 65 is narrower than the area of the end surface of the light-source optical fiber 61 where it overlaps with the end surface of the notification optical fiber for connection 64. The laser light 16 having passed through the light-source optical fiber 61 is thus split into two laser light beams inputted to the notification optical fiber 15a and the image drawing optical fiber 15b. The optical intensity of the laser light 16 inputted to the image drawing optical fiber 15b is lower than the optical intensity of the laser light 16 inputted to the notification optical fiber 15a. The optical intensity is maximized at the center of the light-source optical fiber 61. The notification optical fiber for connection 64 is in contact with the portion where the optical intensity is maximized. As a result, the optical intensity of the laser light 16 inputted to the image drawing optical fiber for connection 65 is lower than the optical intensity of the laser light 16 inputted to the notification optical fiber for connection 64.

The present embodiment provides, at least, the following advantageous effects.

(1) According to the present embodiment, in the splitter 59, part of the laser light 16 having exited out of the light-source optical fiber 61 is incident on the notification optical fiber 15a, and part of the laser light 16 is incident on the image drawing optical fiber 15b. The light incident area of the end surface of the image drawing optical fiber 15b is narrower than the light incident area of the end surface of the notification optical fiber 15a. The optical intensity of the image drawing laser light 16a incident on the image drawing optical fiber 15b can therefore be lower than the optical intensity of the notification laser light 16b incident on the notification optical fiber 15a. Adjusting the positional relationship of the notification optical fiber 15a and the image drawing optical fiber 15b with the light-source optical fiber 61 allows the ratio between the amount of image drawing laser light 16a and the amount of notification laser light 16b to be readily adjusted.

(2) According to the present embodiment, in the splitter 62, part of the laser light 16 having exited out of the light-source optical fiber 61 is incident on the notification optical fiber 15a, and part of the laser light 16 is incident on the image drawing optical fiber 15b. The area of the end surface of the image drawing optical fiber for connection 65, which is connected to the light-source optical fiber 61, is narrower than the area of the end surface of the notification optical fiber for connection 64, which is connected to the light-source optical fiber 61. The optical intensity of the image drawing laser light 16a incident on the image drawing optical fiber 15b can therefore be lower than the optical intensity of the notification laser light 16b incident on the notification optical fiber 15a. Adjusting the areas of the notification optical fiber for connection 64 and the image drawing optical fiber for connection 65, which are in contact with the light-source optical fiber 61, allows the ratio between the amount of image drawing laser light 16a and the amount of notification laser light 16b to be readily adjusted.

Third Embodiment

Another embodiment of the image display apparatus will be described next with reference to FIG. 8. The present embodiment differs from the first embodiment in that the splitter and the variable ND filter 33 are relocated from the display control unit 6 to the base portion 3. The same points as those in the first embodiment will not be described.

Figure 8:
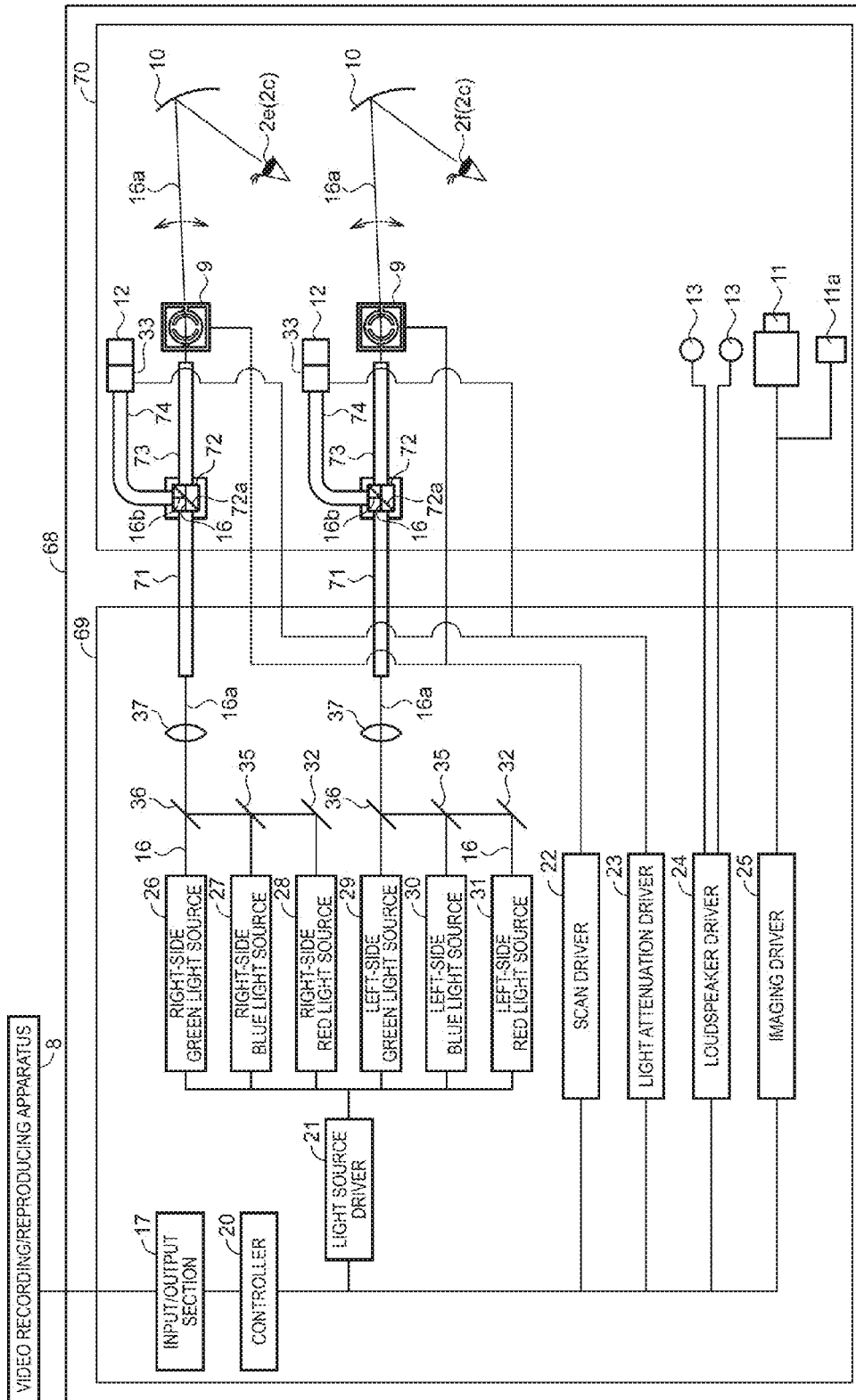
FIG. 8 is an electrical control block diagram showing the structure of an image display apparatus according to a third embodiment.

FIG. 8 is an electrical control block diagram showing the structure of the image display apparatus. That is, in the present embodiment, an image display apparatus 68 includes a display control unit 69 and a base portion 70, as shown in FIG. 8. The image display apparatus 68 is provided with the right-side green light source 26, the right-side blue light source 27, and the right-side red light source 28. The laser light beams 16 emitted from the light sources are combined with each other by the first half-silvered mirror 32, the second half-silvered mirror 35, and the third half-silvered mirror 36. The combined laser light 16 is focused by the focusing lens 37 and incident on a light-source optical fiber 71. The light-source optical fiber 71 transports the laser light 16 from the display control unit 69 to the base portion 70. The light-source optical fiber 71 and wiring lines that connect the display control unit 69 to the base portion 70 are accommodated in a tube (not shown).

The base portion 70 is provided with a splitter 72, and the light-source optical fiber 71 is connected to the splitter 72. The splitter 72 is provided with a splitting half-silvered mirror 72a. The laser light 16 having exited out of the light-source optical fiber 71 impinges on the splitting half-silvered mirror 72a. The splitting half-silvered mirror 72a receives the image drawing laser light 16a and transmits about 1/10000 of the amount of image drawing laser light 16a. The splitter 72 then uses a focusing lens (not shown) to focus the image drawing laser light 16a and outputs the focused laser light toward an image drawing optical fiber 73. The image drawing optical fiber 73 guides the image drawing laser light 16a to the scanning optical output section 9, and the image drawing laser light 16a impinges on the scanning optical output section 9. The scanning optical output section 9 scans the half-silvered mirror 10 located within the field of view of the right eye 2e with the image drawing laser light 16a to form a virtual image.

The notification laser light 16b reflected off the splitting half-silvered mirror 72a is focused by a collector lens (not shown) and incident on a notification optical fiber 74. The notification optical fiber 74 guides the notification laser light 16b to the variable ND filter 33, and the notification laser light 16b impinges on the variable ND filter 33. The variable ND filter 33 attenuates the notification laser light 16b when the optical intensity thereof is greater than the intensity judgment value 55 to the optical intensity equal to the intensity judgment value 55 and outputs the attenuated laser light to the image drawing notification section 12. The image drawing notification section 12 is disposed on the base portion 70 in the vicinity of the right eye 2e. The image drawing notification section 12 diffuses the inputted notification laser light 16b.

The image display apparatus 68 is further provided with the left-side green light source 29, the left-side blue light source 30, and the left-side red light source 31. The laser light 16 outputted from each of the left-side light sources follows the same path along which the laser light 16 outputted from each of the right-side light sources travels, and no detailed description of the optical path associated with the left-side light sources will therefore be made. The scanning optical output section 9 scans the half-silvered mirror 10 located within the field of view of the left eye 2f with the image drawing laser light 16a to form a virtual image. The notification laser light 16b separated by the splitter 72 is diffused by the image drawing notification section 12 disposed on the base portion 70 in the vicinity of the left eye 2f.

The present embodiment provides, at least, the following advantageous effect.

(1) According to the present embodiment, the display control unit 69 and the base portion 70 are connected to each other via the light-source optical fibers 71 and wiring lines. The optical fibers and the wiring lines that connect the display control unit 69 and the base portion 70 to each other are accommodated in a tube. When a large number of optical fibers are used, they undesirably require a thick tube, whereas in the present embodiment, the tube can be thin and hence can be not noticeably large.

Fourth Embodiment

Another embodiment of the image display apparatus will be described next with reference to FIG. 9. The present embodiment differs from the first embodiment in that the display control unit 6 is disposed on the base portion 3. The same points as those in the first embodiment will not be described.

Figure 9:
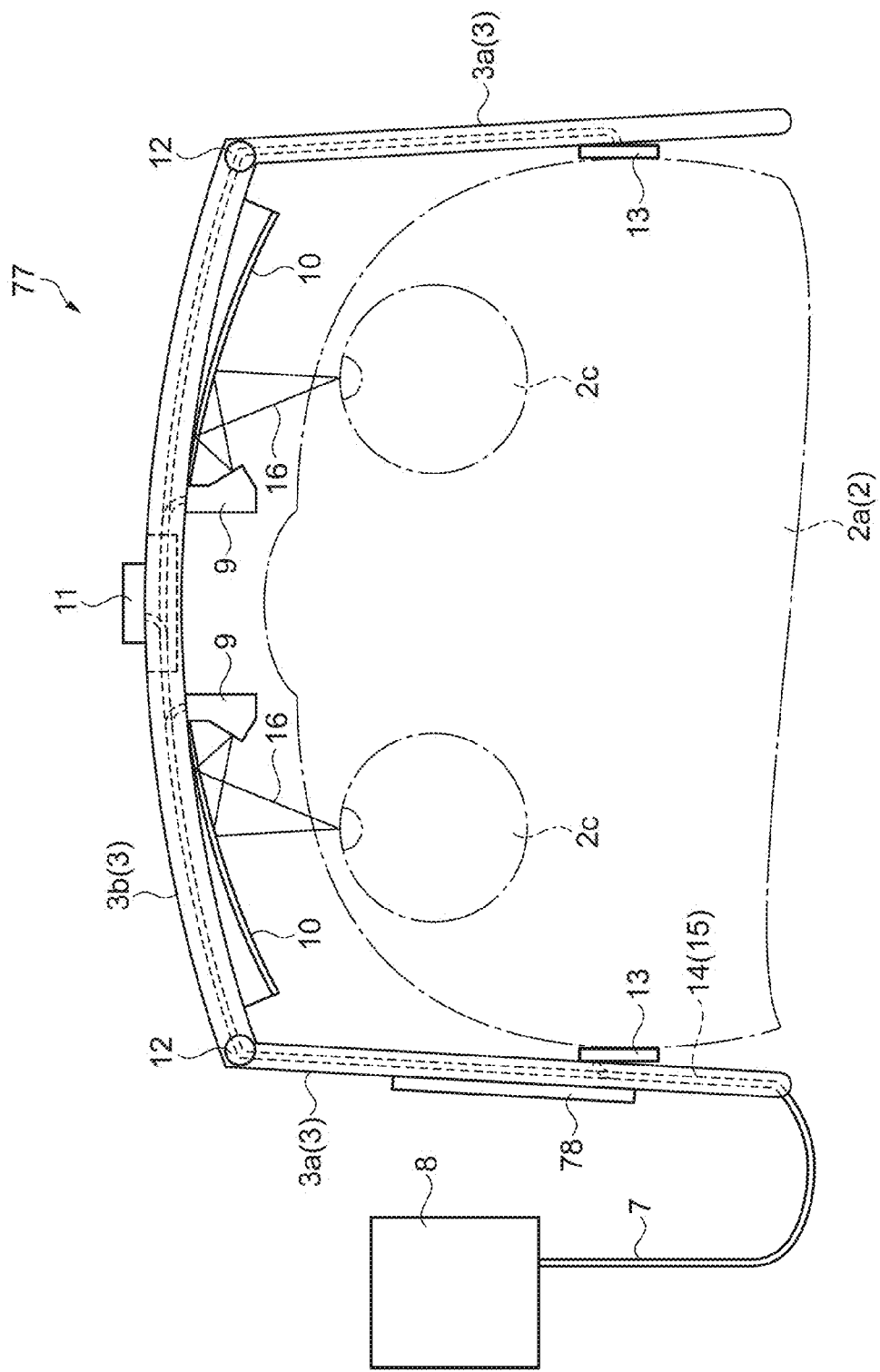
FIG. 9 is a diagrammatic plan view showing the structure of an image display apparatus according to a fourth embodiment.

FIG. 9 is a diagrammatic plan view showing the structure of the image display apparatus. That is, in the present embodiment, an image display apparatus 77 includes the base portion 3 formed of the sidepieces 3a and the frame 3b, as shown in FIG. 9. One of the sidepieces 3a is provided with a display control unit 78. The display control unit 78 has the same function as that of the display control unit 6 in the first embodiment.

The image display apparatus 77 has a structure in which the base portion 3 and the display control unit 78 are integrated with each other. The display control unit 78 therefore does not need to be accommodated, for example, in a chest pocket of the viewer 2, whereby the image display apparatus 77 can be readily operated. Further, since the base portion 3 and the display control unit 78 are not connected to each other with a long cord, a cumbersome cord accommodating operation can be eliminated.

Fifth Embodiment

Another embodiment of the image display apparatus will be described next with reference to FIGS. 10 and 11. The present embodiment differs from the first embodiment in that imaging notification sections are provided as well as the image drawing notification sections 12. The imaging notification sections notify that the imaging section 11 is performing imaging. The same points as those in the first embodiment will not be described.

Figure 10:
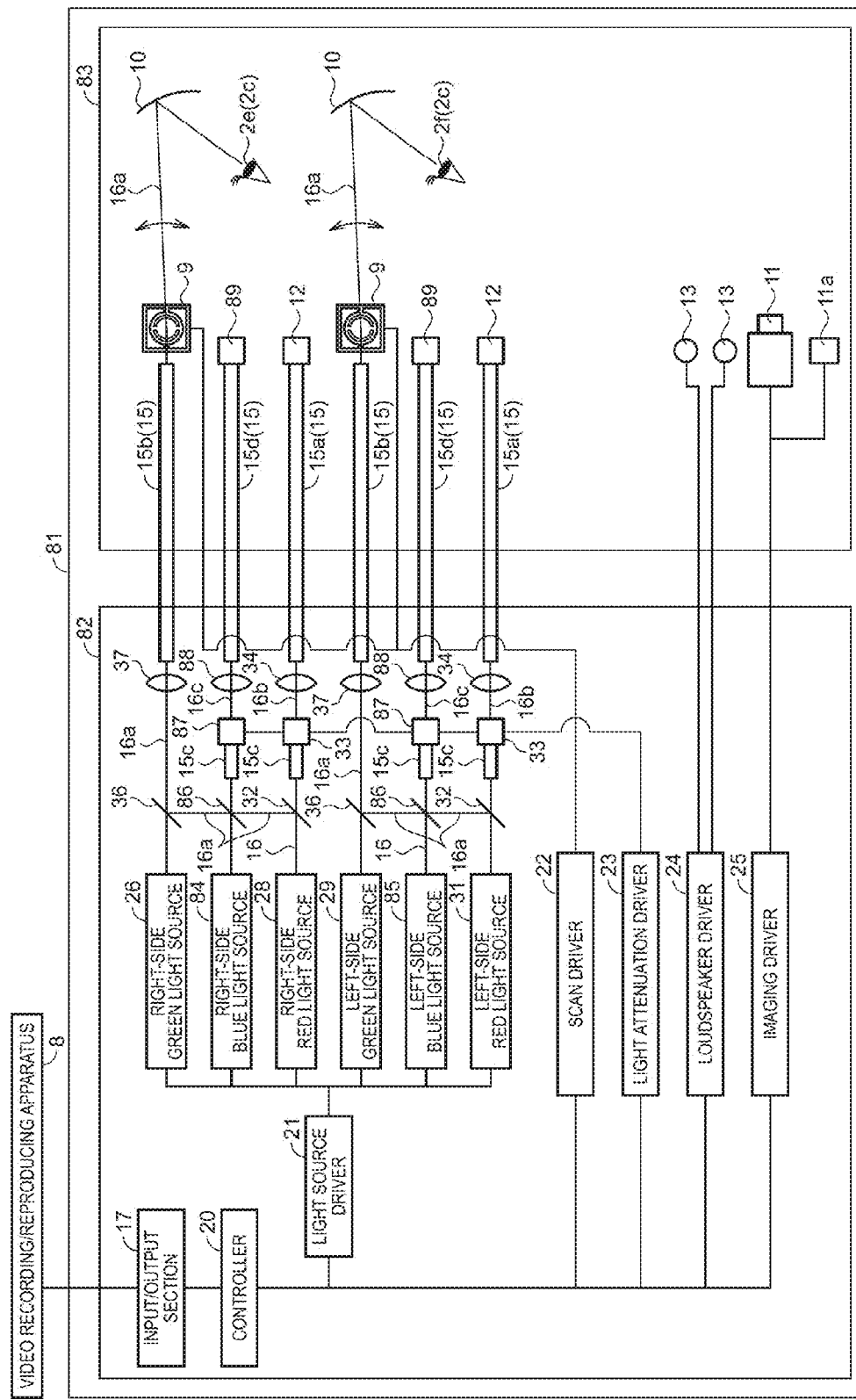
FIG. 10 is an electrical control block diagram showing the structure of an image display apparatus according to a fifth embodiment.

FIG. 10 is an electrical control block diagram showing the structure of the image display apparatus. That is, in the present embodiment, an image display apparatus 81 includes a display control unit 82 and a base portion 83, as shown in FIG. 10. The image display apparatus 81 further includes the light source driver 21, and the right-side green light source 26, a right-side blue light source 84, the right-side red light source 28, the left-side green light source 29, a left-side blue light source 85, and the left-side red light source 31 are connected to the light source driver 21.

Each of the right-side green light source 26 and the left-side green light source 29 has an ND filter built therein. Each of the ND filters receives the emitted laser light 16 and outputs about 1/10000 of the amount of laser light. Light emitted from the right-side blue light source 84, the right-side red light source 28, the left-side blue light source 85, and the left-side red light source 31 is not attenuated and the entire amount of light is outputted.

The laser light 16 emitted from the right-side blue light source 84 impinges on a fourth half-silvered mirror 86. The fourth half-silvered mirror 86 reflects and redirects about 1/10000 of the laser light 16 emitted from the right-side blue light source 84 to form the image drawing laser light 16a. Imaging notification laser light 16c as the second laser light travels straight through the fourth half-silvered mirror 86 and impinges on the light-source-side optical fiber 15c, which leads to a variable ND filter 87. The variable ND filter 87 has the same function as that of the variable ND filter 33 and hence controls the attenuation factor at which the imaging notification laser light 16c passing through the variable ND filter 87 is attenuated. The variable ND filter 87 is driven by the light attenuation driver 23 and controlled by the controller 20.

When the imaging section 11 is performing imaging, the controller 20 drives the light attenuation driver 23 to control the variable ND filter 87 in such a way that the optical intensity of the imaging notification laser light 16c is not greater than the intensity judgment value 55. When the imaging section 11 is not performing imaging, the controller 20 increases the attenuation factor of the variable ND filter 87 to lower the optical intensity of the imaging notification laser light 16c passing through the variable ND filter 87. Alternatively, the controller 20 prevents the imaging notification laser light 16c from passing through the variable ND filter 87.

The imaging notification laser light 16c having passed through the variable ND filter 87 impinges on a focusing lens 88. The imaging notification laser light 16c having passed through the focusing lens 88 impinges on an imaging notification optical fiber 15d. An imaging notification section 89 is provided as the notification section on the opposite end of the imaging notification optical fiber 15d to the focusing lens 88. The imaging notification section 89 is disposed on the base portion 83 in the vicinity of the image drawing notification section 12. When the imaging section 11 is performing imaging, the imaging notification laser light 16c guided through the imaging notification optical fiber 15d is diffused by the imaging notification section 89. When the imaging section 11 is not performing imaging, the imaging notification section 89 becomes dim. A person who looks at the imaging notification section 89 is notified whether or not the viewer 2 is performing imaging by using the imaging section 11.

The path along which the laser light 16 outputted from the left-side blue light source 85 travels and forms the imaging notification laser light 16c, which is diffused by the imaging notification section 89, is the same as the path of the imaging notification laser light 16c outputted from the right-side blue light source 84 to the imaging notification section 89, and no description will be made of the path associated with the left-side blue light source 85. The path along which the laser light 16 outputted from the left-side green light source 29 to the left-side red light source 31 travels and reaches the left eye 2f is the same as the path along which the laser light 16 outputted from the right-side green light source 26 to the right-side red light source 28 travels and reaches the right eye 2e, and no description of the path associated with the left-side light sources will therefore be made.

The imaging section 11 captures images but does not draw the images on the half-silvered mirror 10 in some cases. In such cases, the light source driver 21 drives the right-side blue light source 84 and the left-side blue light source 85 but does not drive the right-side green light source 26, the right-side red light source 28, the left-side green light source 29, or the left-side red light source 31. The scan driver 22 then does not scan the half-silvered mirror 10 with the image drawing laser light 16a but directs the image drawing laser light 16a to positions that are invisible to the right eye 2e and the left eye 2f. Alternatively, the scan driver 22 may direct the image drawing laser light 16a to positions on the half-silvered mirror 10 but on the edges of the fields of view of the right eye 2e and the left eye 2f. It is preferable that the image drawing laser light 16a is directed to positions where the viewer 2 is not annoyed. In this case, the light source driver 21 and the scan driver 22 may be driven so that characters or figures representing that imaging is underway are displayed. Still alternatively, an optical switch that controls whether or not the image drawing laser light 16a is allowed to pass may be provided.

Figure 11:
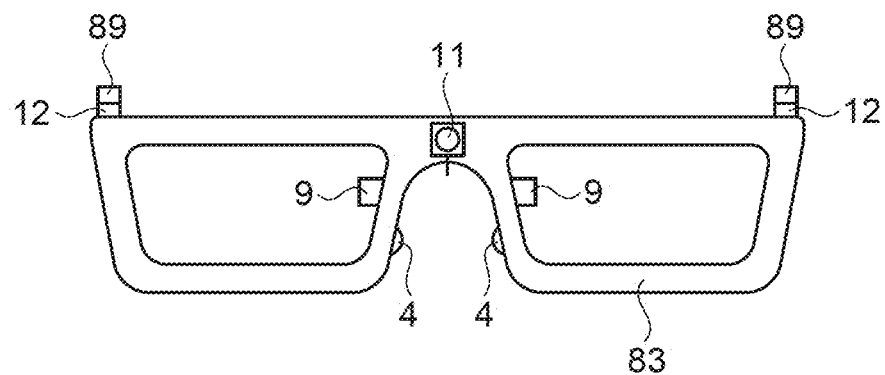
FIG. 11 is a diagrammatic view for describing the position of each notification section disposed on a base portion.

FIG. 11 is a diagrammatic view for describing the position of each of the notification sections disposed on the base portion. The imaging notification sections 89 are disposed so that they are layered on the image drawing notification sections 12, as shown in FIG. 11. Light having exited out of the imaging notification sections 89 is visible from the front, the right side, and the left side of the base portion 83.

The present embodiment provides, at least, the following advantageous effect.

(1) According to the present embodiment, the imaging notification sections 89 diffuse the imaging notification laser light 16c to notify whether or not the imaging section 11 is performing imaging. Using no imaging notification laser light 16c requires a separate notification light source. The image display apparatus 81 can therefore be readily manufactured because the structure of the apparatus can be simplified as compared with a case where a light source for notifying whether the imaging section 11 is performing imaging is provided.

Sixth Embodiment

Another embodiment of the image display apparatus will be described next with reference to FIGS. 12A to 12C. The present embodiment differs from the first embodiment in that the image drawing notification sections 12 are disposed in different positions. The same points as those in the first embodiment will not be described.

Figure 12A:
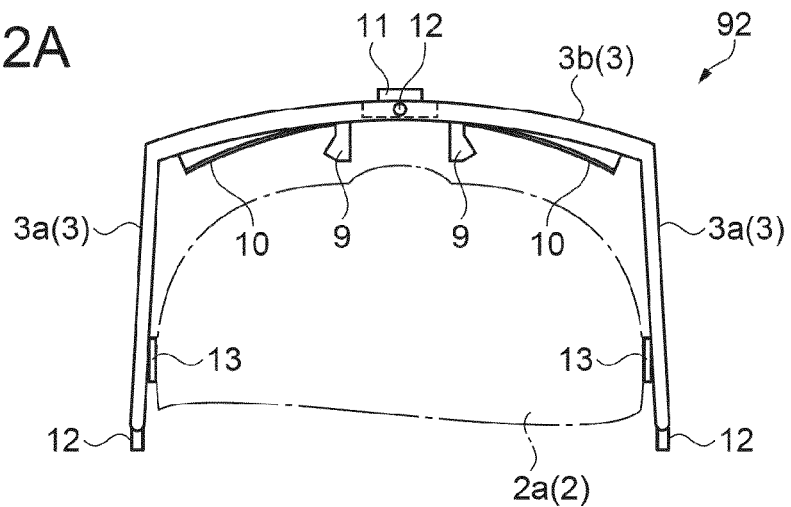
FIGS. 12A to 12C relate to a sixth embodiment and are diagrammatic plan views for describing the positions where image drawing notification sections are provided.
Figure 12B:
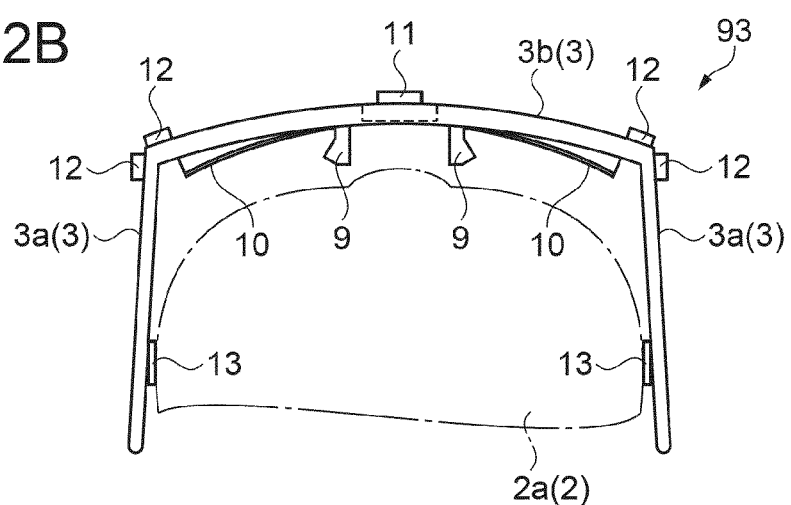
Figure 12C:
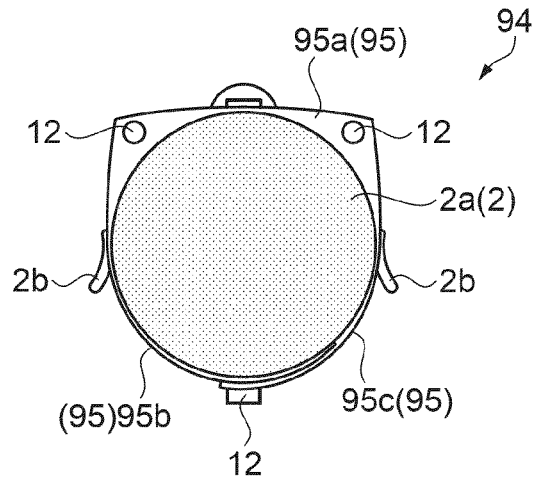

FIGS. 12A to 12C are diagrammatic plan views for describing the positions where the image drawing notification sections are disposed. That is, in an image display apparatus 92, the image drawing notification sections 12 are disposed on the frame 3b and the sidepieces 3a, as shown in FIG. 12A. The image drawing notification section 12 disposed on the frame 3b is specifically disposed at the center thereof facing the forehead of the head 2a. The image drawing notification section 12 disposed in this position is visible from the front, the top of the head, and the lateral sides of the viewer 2.

The image drawing notification sections 12 disposed on the sidepieces 3a are specifically disposed on the right and left sides and on the side toward the back of the head. The image drawing notification sections 12 disposed in these positions are visible from the rear and the lateral sides of the viewer 2. The image drawing notification sections 12 can therefore diffuse the notification laser light 16b in the frontward, rearward, rightward, and leftward directions with respect to the viewer 2.

In an image display apparatus 93, the image drawing notification sections 12 are disposed on the frame 3b and the sidepieces 3a, as shown in FIG. 12B. The image drawing notification sections 12 disposed on the frame 3b are specifically disposed on the right and left sides. The image drawing notification sections 12 disposed in these positions are visible from the center, right, and left with respect to a position in front of the viewer 2.

The image drawing notification sections 12 disposed on the sidepieces 3a are specifically disposed on the front right and left portions. The image drawing notification sections 12 disposed in these positions are visible from the right and left sides of the viewer 2. The image drawing notification sections can therefore diffuse the notification laser light 16b frontward, rightward, and leftward with respect to the viewer 2.

An image display apparatus 94 includes a base portion 95 as the support, and the base portion 95 is formed of a frame portion 95a, a first wrap portion 95b, and a second wrap portion 95c, as shown in FIG. 12C. The first wrap portion 95b is connected to the left end of the frame portion 95a and extends along the head 2a of the viewer 2 on the left in FIG. 12C. Similarly, the second wrap portion 95c is connected to the right end of the frame portion 95a and extends along the head 2a of the viewer 2 on the right in FIG. 12C. On the rear of the head 2a, the first wrap portion 95b and the second wrap portion 95c overlap with each other. Each of the first wrap portion 95b and the second wrap portion 95c is provided with a surface fastener, which allows the first wrap portion 95b and the second wrap portion 95c to repeatedly engage with each other and disengage from each other. The first wrap portion 95b and the second wrap portion 95c do not necessarily engage with each other via surface fasteners but may, for example, be bonded to each other via a hook or a button.

The image drawing notification sections 12 are disposed on right and left portions of the frame portion 95a on the side of the top of the head. The image drawing notification sections 12 disposed in these positions can diffuse the notification laser light 16b in central, rightward, and leftward directions with respect to a position in front of the viewer 2. The image drawing notification section 12 disposed on the second wrap portion 95c is specifically disposed on the rear of the head 2a. The image drawing notification section 12 disposed in this position can diffuse the notification laser light 16b rearward, rightward, and leftward with respect to the viewer 2. The image drawing notification sections 12 can therefore diffuse the notification laser light 16b frontward, rearward, rightward, and leftward with respect to the viewer 2.

Seventh Embodiment

Another embodiment of the image display apparatus will be described next with reference to FIGS. 13A to 13C. The present embodiment differs from the first embodiment in that the image drawing notification sections 12 are differently structured. The same points as those in the first embodiment will not be described.

Figure 13A:
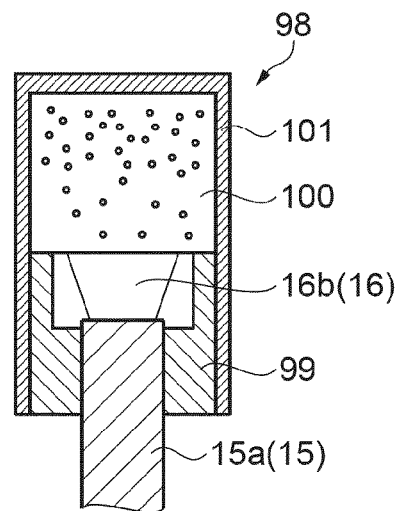
FIGS. 13A to 13C relate to a seventh embodiment and are diagrammatic side cross-sectional views showing a variety of structures of each of the image drawing notification sections.
Figure 13B:
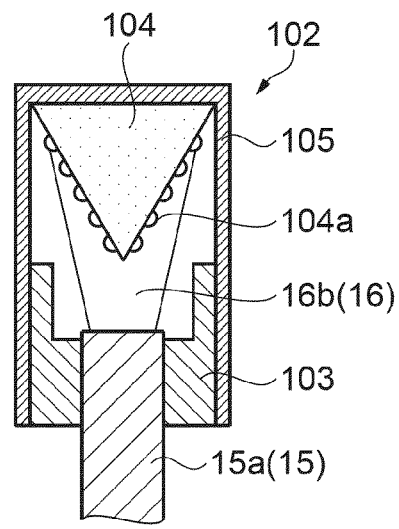
Figure 13C:
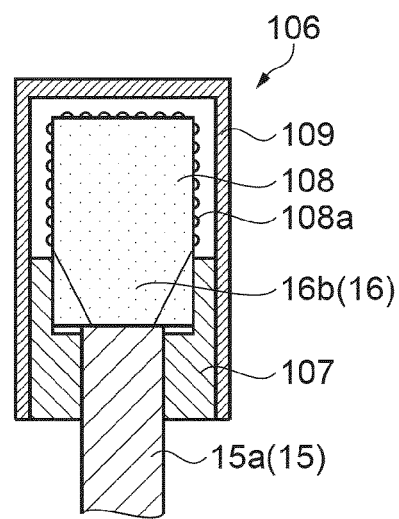

FIGS. 13A to 13C are diagrammatic side cross-sectional views showing a variety of structures of the image drawing notification sections. In other words, FIGS. 13A, 13B, and 13C show different forms of the image drawing notification sections. That is, as shown in FIG. 13A, an image drawing notification section 98 as the notification section includes a cylindrical base 99, and a hole is formed through the base 99 in the upward/downward direction in FIG. 13A. The notification optical fiber 15a is inserted into the hole and fixed therein. The notification laser light 16b exits out of the notification optical fiber 15a upward in FIG. 13A. A light diffuser 100 is disposed above the notification optical fiber 15a in FIG. 13A. The light diffuser 100 is made of a light transmissive material, has a circular columnar shape, and has air bubbles present therein. The density of the air bubbles increases with distance from the notification optical fiber 15a. The air bubbles may be replaced with particles that reflect light. The particles can be metal particles or pieces produced by minutely cutting a metal thin film.

When the notification laser light 16b passes through the light diffuser 100, the laser light is diffused and redirected in a variety of directions. An exterior portion 101 is provided so that it covers the light diffuser 100. The exterior portion 101 has a cylindrical shape having a bottom and transmits light. The notification laser light 16b therefore passes through the exterior portion 101 and travels in the diffused directions.

As shown in FIG. 13B, an image drawing notification section 102 as the notification section includes a cylindrical base 103, and a hole is formed through the base 103 in the upward/downward direction in FIG. 13B. The notification optical fiber 15a is inserted into the hole and fixed therein. The notification laser light 16b exits out of the notification optical fiber 15a upward in FIG. 13B. A light diffuser 104 is provided above the notification optical fiber 15a in FIG. 13B with a space therebetween. The light diffuser 104 is made of a light transmissive material, has a conical shape, and has a pattern 104a formed of minutes dots and provided on the surface of the light diffuser. The pattern 104a may be made of a pigment that reflects and diffuses light, for example, in a printing process. The pigment can, for example, be silver white, titanium white, or zinc white.

The notification laser light 16b is reflected off and diffused by the pattern 104a of the light diffuser 104. The notification laser light 16b that passes through the light diffuser 104 travels straight. An exterior portion 105 is provided so that it covers the light diffuser 104. The exterior portion 105 has a cylindrical shape having a bottom and transmits light. The notification laser light 16b therefore passes through the exterior portion 105 and travels in the diffused directions.

As shown in FIG. 13C, an image drawing notification section 106 as the notification section includes a cylindrical base 107, and a hole is formed through the base 107 in the upward/downward direction in FIG. 13C. The notification optical fiber 15a is inserted into the hole and fixed therein. The notification laser light 16b exits out of the notification optical fiber 15a upward in FIG. 13C. A light diffuser 108 is provided above the notification optical fiber 15a in FIG. 13C. The light diffuser 108 is made of a light transmissive material, has a circular columnar shape, and has a pattern 108a formed of minutes dots and provided on the surface of the light diffuser. The pattern 108a may be made of a pigment that reflects and diffuses light, for example, in a printing process. The pigment can, for example, be silver white, titanium white, or zinc white.

The notification laser light 16b is reflected off and diffused by the pattern 108a of the light diffuser 108. The notification laser light 16b incident on the light diffuser 108 is reflected off the surface of the light diffuser 108. The notification laser light 16b is diffused when it impinges on the pattern 108a. An exterior portion 109 is provided so that it covers the light diffuser 108, and a space filled with air is created between the light diffuser 108 and the exterior portion 109. The exterior portion 109 has a cylindrical shape having a bottom and transmits light. The notification laser light 16b therefore passes through the exterior portion 109 and travels in the diffused directions.

The present embodiment provides, at least, the following advantageous effect.

(1) According to the present embodiment, the image drawing notification section 98, the image drawing notification section 102, and the image drawing notification section 106 diffuse the notification laser light 16b having exited out of the notification optical fiber 15a. Whether or not the image drawing notification section 98, the image drawing notification section 102, and the image drawing notification section 106 are emitting light can therefore be readily checked from any direction.

The invention is not limited to the embodiments described above, and a variety of changes and modifications can be made thereto by those skilled in the art within the technical scope of the invention. Some of these variations are described below.

Variation 1

In the first embodiment described above, the half-silvered mirrors 10 are disposed inside the frame 3b. Each of the half-silvered mirrors 10 may be replaced with a total reflection mirror. In this case, the viewer 2 can concentrate on observing video images drawn by the image display apparatus. The image drawing notification sections 12 can notify that image drawing is underway also in this case.

Variation 2

In the first embodiment described above, only one imaging section 11 is provided at the center of the frame 3b. Two imaging sections 11 may be provided on the frame 3b for stereoscopic imaging. In this case, the imaging sections are preferably disposed with a distance therebetween. Images that provide a greater amount of stereoscopic sensation can be provided. Two microphones 11a may also be provided for stereoscopic recording. Sound that provides a wide spatial sensation can be recorded.

Variation 3

In the first embodiment described above, each of the image drawing notification sections 12 has a circular columnar shape. Each of the image drawing notification sections 12 does not necessarily have a specific shape and may, for example, have a spherical shape, a spindle shape, a box-like shape, a cubic shape, or a polyhedral shape. Each of the image drawing notification sections 12 may have a shape according to the exterior shape of the image display apparatus 1. In this case, a variety of exterior shapes of the image display apparatus can be provided.

Variation 4

In the first embodiment described above, the right-side green light source 26, the right-side blue light source 27, and the right-side red light source 28 are provided to draw a color image. A color image is not necessarily drawn, and a black-and-white image may be drawn. In this case, the number of light sources, mirrors, and other components can be reduced to provide a compact, lightweight image display apparatus.

Variation 5

In the first embodiment described above, light sources for the right eye 2e and light sources for the left eye 2f are provided for stereoscopic image drawing. Alternatively, the same image may be drawn to be viewed with the right eye 2e and the left eye 2f. In this case, the number of light sources, mirrors, and other components can be reduced to provide a compact, lightweight image display apparatus.

Variation 6

In the first embodiment described above, the image drawing notification sections 12 are emitting light during image drawing operation to notify that the image drawing is underway. The image drawing notification sections 12 may be caused to emit light in a flashing manner when the imaging section 11 is used to perform imaging operation to notify that the imaging is underway. Further, when image drawing and imaging are simultaneously performed, the frequency at which the image drawing notification sections 12 emit light in a flashing manner may be changed or a pattern according to which the image drawing notification sections 12 emit light in a flashing manner may be changed. Only one image drawing notification section 12 may be used to notify that image drawing is underway, that imaging is underway, and that image drawing and imaging are underway.

Variation 7

In the first embodiment described above, the laser light 16 outputted from red light sources causes the image drawing notification sections 12 to emit light. Instead of using the red light sources, blue or green laser light 16 may cause the image drawing notification sections 12 to emit light. Further, any two of the color laser light beams 16 or the three color laser light beams 16 may be combined with each other. Since the number of colors of the light diffused through the image drawing notification sections 12 can be increased, notification can be issued by using an optimum color.

Variation 8

In the first embodiment described above, a reflection film is used to split the laser light 16. Another method for splitting the laser light 16 may be used. For example, the laser light 16 may be caused to be incident on the interface between materials having different refractive indices. In this method, the angle of incidence at which the laser light 16 is incident on the interface may be changed to cause part of the laser light 16 to be reflected off or pass through the interface. As a still another method, the laser light 16 may be split by using a combination of diffraction gratings.

Variation 9

In the first embodiment described above, the variable ND filter 33 controls the notification laser light 16*b* in such a way that the optical intensity thereof is not greater than the intensity judgment value 55. When the optical intensity of the notification laser light 16*b* diffused through each of the image drawing notification sections 12 is allowed to vary, the variable ND filter 33 may be replaced with an ND filer having a fixed attenuation factor. Since no member for controlling the attenuation factor is required, the image display apparatus 1 can be more readily manufactured.

Variation 10

In the first embodiment described above, the base portion 3 is securely mounted on the head 2*a* with the base portion 3 supported by the ears 2*b* and the nose 2*d*. How to securely place the frame 3*b* on the head 2*a* is not limited to the technique described above. For example, the frame 3*b* may be placed on a hat. Instead, a support that extends from the frame 3*b* via the top of the head 2*a* to the rear of the head 2*a* may be provided. The frame 3*b* may be readily placed in an arbitrary manner.

Variation 11

In the first embodiment described above, the optical intensity of the image drawing laser light 16*a* is set to be lower than the optical intensity of the notification laser light 16*b*. The optical intensity of the image drawing laser light 16*a* may instead be equal to or higher than the optical intensity of the notification laser light 16*b*. The optical intensity may be changed so that the output light is readily viewed and hence visible notification of image drawing operation is readily recognized.

Variation 12

In the third embodiment described above, the right-side green light source 26 to the left-side red light source 31 are disposed in the display control unit 69. The right-side green light source 26 to the left-side red light source 31 may be disposed in the base portion 70. In this case, no light-source optical fiber 71 is present between the display control unit 69 and the base portion 70 but only the wiring lines are present, whereby the tube can be more flexible.

Variation 13

The splitters 59 and 62 in the second embodiment described above are used in place of the first half-silvered mirror 32 in the first embodiment. Further, the splitters 59 and 62 may be used in place of the first half-silvered mirror 32 in the third embodiment. Moreover, the splitters 59 and 62 may be used in place of the first half-silvered mirror 32 in the fifth embodiment. Still further, the splitters 59 and 62 may be used in place of the fourth half-silvered mirror 86 in the fifth embodiment.

Variation 14

The imaging notification section 89 in the fifth embodiment described above may be used with the base portion 70 in the third embodiment. In this case as well, whether the imaging section 11 is performing imaging can be notified.

Variation 15

The image drawing notification section 98, the image drawing notification section 102, and the image drawing notification section 106 in the seventh embodiment described above can be used in place of not only the image drawing notification sections 12 in the first embodiment but also the imaging notification section 89. The image drawing notification sections 98, 102, and 106 can also be used in each of the second to sixth embodiments.

What is claimed is:

1. A head-mounted image display apparatus, the apparatus comprising:
    a light source that emits laser light;
    a splitter that splits the laser light into first laser light and second laser light;
    an image drawing section that performs image drawing with the first laser light; and
    a notification section that receives the second laser light and thereupon emits a notification that the image drawing section is performing the image drawing.

2. The head-mounted image display apparatus according to claim 1,
    wherein the image drawing section includes a pivoting mirror that reflects the first laser light to perform the image drawing.

3. The head-mounted image display apparatus according to claim 2, further comprising:
    a controller operatively coupled to the mirror and controlling pivotal motion of the mirror.

4. The head-mounted image display apparatus according to claim 1,
    wherein the notification section includes a diffuser that diffuses the second laser light to emit the notification that the image drawing section is performing the image drawing.

5. The head-mounted image display apparatus according to claim 1, wherein the optical intensity of the first laser light is lower than the optical intensity of the second laser light.

6. The head-mounted image display apparatus according to claim 1,
wherein the splitter includes a reflection film that transmits part of the laser light so that the laser light is split into the first laser light and the second laser light.

7. The head-mounted image display apparatus according to claim 1,
wherein the laser light includes a plurality of light rays having different colors, and
the splitter simultaneously combines a first part of the plurality of light rays with each other and separates a second part of the plurality of light rays from each other.

8. The head-mounted image display apparatus according to claim 1,
wherein the second laser light is red.

9. The head-mounted image display apparatus according to claim 1, further comprising:
a light-source optical fiber guiding the laser light therethrough;
a first optical fiber guiding the first laser light therethrough; and
a second optical fiber guiding the second laser light therethrough; and
wherein, in the splitter, an end surface of the light-source optical fiber is connected to an end surface of the first optical fiber and an end surface of the second optical fiber, and
an area of the end surface of the first optical fiber where the end surface of the first optical fiber is connected to the end surface of the light-source optical fiber is narrower than an area of the end surface of the second optical fiber where the end surface of the second optical fiber is connected to the end surface of the light-source optical fiber.

10. The head-mounted image display apparatus according to claim 1, further comprising:
an imaging section operatively associated with the image drawing section,
wherein the notification section uses the second laser light to notify that the imaging section is performing imaging.

11. The head-mounted image display apparatus according to claim 1, further comprising:
a light attenuator optically communicating with the splitter and attenuating the optical intensity of the second laser light.

12. The head-mounted image display apparatus according to claim 11,
wherein the light attenuator attenuates the second laser light in accordance with the optical intensity of the second laser light to suppress a change in the optical intensity of the second laser light by the notification section.

13. The head-mounted image display apparatus according to claim 1, further comprising:
a support that supports the image drawing section with the aid of a head of a person,
wherein the notification section is disposed on the support in a position visible from a front and lateral sides of the head of the person.

14. The head-mounted image display apparatus according to claim 1, further comprising:
a support that supports the image drawing section with the aid of a head of a person,
wherein the notification section is disposed on the support in a position visible from a right lateral side and a left lateral side when viewed from a front of the head of the person.

15. A head-mounted image display apparatus, the apparatus comprising:
a light source that emits laser light;
a splitter that splits the laser light into first laser light and second laser light,
an image drawing section that performs image drawing by using the first laser light; and
a notification section that emits a notification by using the second laser light that the image drawing section is performing the image drawing.

16. The head-mounted image display apparatus according to claim 15,
wherein the optical intensity of the first laser light is lower than the optical intensity of the second laser light.

17. A head-mounted image display apparatus, the apparatus comprising:
a light source that emits laser light;
a splitter optically communicating with the light source, the splitter receiving and splitting the laser light into a first laser light and second laser light,
an image drawing section optically communicating with the splitter, the image drawing section receiving and drawing an image with the first laser light; and
a notification section optically communicating with the splitter, the notification section receiving the second laser light and thereupon emitting a visibly recognizable notification indicating that the image drawing section is drawing the image.

18. The head-mounted image display apparatus according to claim 17,
wherein the notification section includes a diffuser that diffuses the second laser light into the visibly recognizable notification.

19. The head-mounted image display apparatus according to claim 17, further comprising:
a light-source optical fiber optically communicating with the light source so as to receive and guide the laser light therethrough;
a first optical fiber having a first light receiving end connected to a light emitting end of the light-source optical fiber so as to receive and guide the first laser light therethrough; and
a second optical fiber having a second light receiving end connected to the light emitting end of the light-source optical fiber so as to receive and guide the second laser light therethrough; and
wherein the first light receiving end contacts a smaller area of the light emitting end than the second light receiving end.

20. The head-mounted image display apparatus according to claim 17, further comprising:
a light attenuator optically communicating with the splitter and attenuating the optical intensity of the second laser light.

* * * * *